(12) United States Patent
Dendas et al.

(10) Patent No.: US 9,383,521 B2
(45) Date of Patent: Jul. 5, 2016

(54) CABLE FIXTURE ASSEMBLY FOR FASTENING AT LEAST ONE CABLE AT A CABLE CARRIER AS WELL AS A SPLITTER COMPRISING SUCH CABLE FIXTURE ASSEMBLY

(71) Applicant: TYCO ELECTRONICS NETHERLAND BV, AR's Hertogenbosch (NL)

(72) Inventors: Freddy Jean Philip Dendas, Genk (BE); Marc Jansen, Steensel (NL); Dennis Spaan, Oss (NL)

(73) Assignee: TE Connectivity Nederland B.V., 's-Hertogenbosch (NL)

( * ) Notice: Subject to any disclaimer, the term of this patent is extended or adjusted under 35 U.S.C. 154(b) by 58 days.

(21) Appl. No.: 13/916,332

(22) Filed: Jun. 12, 2013

(65) Prior Publication Data
US 2014/0153876 A1    Jun. 5, 2014

(30) Foreign Application Priority Data
Jun. 13, 2012    (EP) .................................. 12171816

(51) Int. Cl.
*G02B 6/00* (2006.01)
*G02B 6/36* (2006.01)
(Continued)

(52) U.S. Cl.
CPC ............ *G02B 6/3644* (2013.01); *G02B 6/4471* (2013.01); *G02B 6/4477* (2013.01); *H02G 15/007* (2013.01); *G02B 6/3889* (2013.01); *H01R 13/5804* (2013.01); *H01R 24/40* (2013.01); *H02G 15/117* (2013.01); *Y10T 29/49826* (2015.01)

(58) Field of Classification Search
CPC .. G02B 6/3889; G02B 6/3887; G02B 6/4477; G02B 6/4471; G02B 6/3644
USPC ........................................................ 385/138
See application file for complete search history.

(56) References Cited

U.S. PATENT DOCUMENTS 4,279,466 A    7/1981  Makuch et al.
4,447,120 A *  5/1984  Borsuk ........................ 385/136
(Continued)

FOREIGN PATENT DOCUMENTS

EP    0131283 A2    1/1985
EP    0365261 A2    4/1990
GB       703851 A    2/1954

OTHER PUBLICATIONS

European Search Report and Search Comments issued by The Hague, dated Nov. 7, 2012, for European Patent Application No. EP12171816; 4 pages.

*Primary Examiner* — Rhonda Peace
(74) *Attorney, Agent, or Firm* — Faegre Baker Daniels LLP

(57) ABSTRACT

The invention relates to a cable fixture assembly for fastening at least one cable, such as an optical fiber cable, at a cable carrier, such as a housing of a splitter. The cable having a core, a reinforcement cover for protecting the core as well as an outer jacket, wherein the reinforcement cover and the outer jacket are stripped off the core, at least in sections, and the stripped-off reinforcement cover is folded back; as well as the cable carrier, to which the cable is fastened with the fold-back section of the reinforcement cover. Further provided is a method of fastening at least one cable having a core, a reinforcement cover for protecting the core as well as an outer jacket, such as an optical fiber cable, at a cable carrier, such as the housing of a splitter.

20 Claims, 14 Drawing Sheets

(51) Int. Cl.
  *G02B 6/44* (2006.01)
  *H02G 15/007* (2006.01)
  *G02B 6/38* (2006.01)
  *H02G 15/117* (2006.01)
  *H01R 13/58* (2006.01)
  *H01R 24/40* (2011.01)

(56) References Cited

U.S. PATENT DOCUMENTS

| | | | |
|---|---|---|---|
| 4,804,252 A | 2/1989 | Betzler et al. | |
| 4,928,135 A * | 5/1990 | Kayoun et al. | 385/136 |
| 6,058,603 A * | 5/2000 | Reed | 29/857 |
| 6,389,214 B1 * | 5/2002 | Smith et al. | 385/136 |
| 6,565,261 B1 * | 5/2003 | Uchiyama et al. | 385/60 |
| 6,909,828 B2 * | 6/2005 | Zimmel et al. | 385/100 |
| 8,571,367 B2 * | 10/2013 | Van Der Meulen et al. | 385/100 |
| 8,705,930 B2 * | 4/2014 | Lu et al. | 385/137 |
| 8,737,786 B1 * | 5/2014 | Compton et al. | 385/100 |
| 8,754,330 B2 * | 6/2014 | Takahashi et al. | 174/74 R |
| 8,816,222 B2 * | 8/2014 | Pimentel | 174/650 |
| 8,873,926 B2 * | 10/2014 | Beamon et al. | 385/136 |
| 2003/0010519 A1 * | 1/2003 | Pieck | 174/65 R |
| 2006/0204181 A1 | 9/2006 | Reynolds | |
| 2010/0054678 A1 | 3/2010 | DiMarco | |
| 2011/0317975 A1 * | 12/2011 | Lu et al. | 385/137 |
| 2012/0087628 A1 * | 4/2012 | Bran De Leon et al. | 385/136 |
| 2013/0028568 A1 * | 1/2013 | Beamon et al. | 385/136 |
| 2013/0183012 A1 * | 7/2013 | Cabanne Lopez et al. | 385/100 |
| 2014/0153876 A1 * | 6/2014 | Dendas et al. | 385/76 |

\* cited by examiner

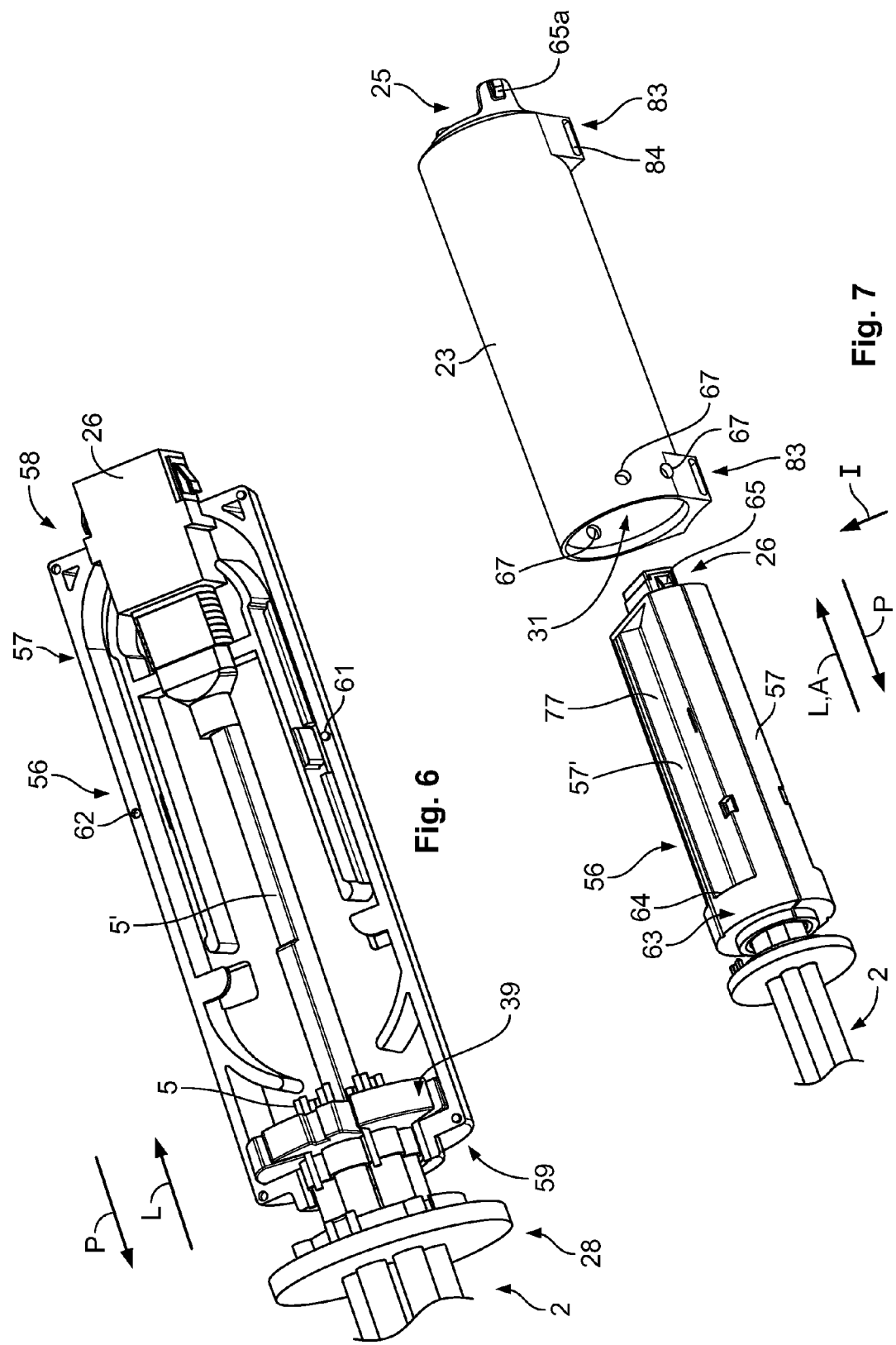

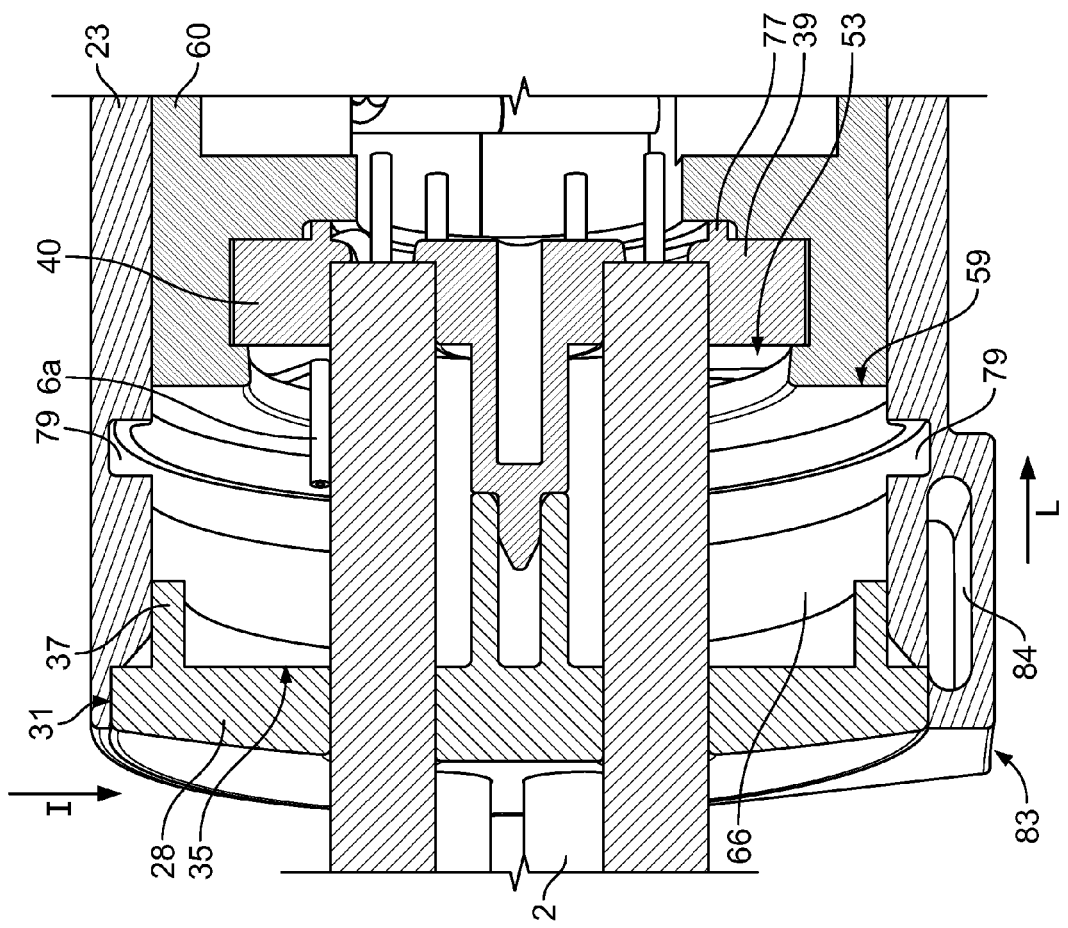

CABLE FIXTURE ASSEMBLY FOR FASTENING AT LEAST ONE CABLE AT A CABLE CARRIER AS WELL AS A SPLITTER COMPRISING SUCH CABLE FIXTURE ASSEMBLY

The present application claims priority of European Patent Application number EP 12171816.7 filed Jun. 13, 2012, the subject matter of which is incorporated herein by reference.

The present invention relates to a cable fixture assembly for fastening at least one cable, such as an optical fibre cable, at a cable carrier, such as a housing of a splitter, said assembly comprising: the cable having a core, a reinforcement cover for protecting the core as well as an outer jacket, wherein the reinforcement cover and the outer jacket are stripped off the core, at least in sections, and the stripped-off reinforcement cover is folded back; as well as the carrier, to which the cable is fastened with the fold-back section of the stripped-off reinforcement cover.

The present invention further relates to a splitter comprising a plurality of cables and a method of fastening at least one cable having a core, a reinforcement cover for protecting the core as well as an outer jacket, such as an optical fibre cable, at a cable carrier, such as the housing of a splitter, the method comprising the steps of stripping the reinforcement cover and the outer jacket off the core, at least in sections; folding back the stripped-off reinforcement cover; and fastening the fold-back section of the reinforcement cover to the cable carrier.

The next generation WiMAX and long-term evolution fibre-to-antenna connectivity designs require rugged cable assemblies for outdoor use. Several single cable assemblies are used in order to install the equipment to an antenna site. Routing several cable assemblies from ground level up to the antenna is cumbersome. Thus, it is advisable to have a single cable routed from ground level up to the antenna and split the single cable close to the antenna. For splitting, a splitter comprising a plurality of cables may be used.

It is essential to firmly fix the cables, at their carrier in order to prevent damaging the cable assembly under tensile load when the cable is pulled at. Conventionally, the cable is fixed to the cable carrier by stripping off the protective cover, such as a Kevlar coating, folding back the Kevlar and gluing it to the cable carrier, which could for example be the housing of the splitter, the housing of an adapter or a termination casing. According to the present invention, the cable carrier is a support, to which the cable is fastened. The above-described conventional way of fastening a cable to a cable carrier brings up the problem that the cable jacket edge, around which the stripped-off protective reinforcement is folded back, will deform when pulled on the cable. This deformation causes an overlength of the reinforcement cover, which weakens the fixation of the cable at the cable carrier and might be detrimental for the cable ferrule.

In view of these disadvantages with the current concept of fastening a cable at a cable carrier, it is an object of the present invention to provide an assembly as well as a method of securing at least one cable at a cable carrier, giving a better resistance against tensile load when the cable is pulled on.

For the cable fixture assembly mentioned in the beginning of this description, the objective underlying this invention is solved in that the cable fixture assembly further comprises a strengthening member, around which the fold-back section of the reinforcement cover is looped.

Accordingly, in the method of securing a cable at a cable carrier mentioned above, the object is solved by looping the fold-back section of the reinforcement cover around a strengthening member.

For the splitter mentioned in the beginning of this description, the objective is solved in that it comprises at least one cable fixture assembly according to the present invention.

The above-mentioned inventive solutions provide a better resistance against tensile load because the strengthening member, around which the fold-back reinforcement cover is looped, compensates and absorbs the load acting on the reinforcement cover that is fastened to the carrier, thereby preventing deformation of the cable jacket and avoiding a lengthening of the reinforcement cover. The strengthening member, which is made from a material which does not deform under the tensile load when the cable is pulled on, thus provides a strain-relief of the cable fixture assembly. By looping the fold-back section of the reinforcement cover around a strengthening member, the section of the cable that is fastened to the carrier is enforced, providing an improved robustness to cable fixtures.

The above-mentioned solutions according to the present invention may be combined in any way with any one of the following advantageous embodiments of the present invention respectively and thus be further improved.

According to an embodiment of the cable fixture assembly as well as the method of the present invention, the strengthening member may be arranged at the tip of the stripped-off outer jacket. In particular, the strengthening member may be arranged such that it covers the tip of the stripped-off outer jacket, preferably covering the outer jacket at the end face or front face, which substantially faces in the longitudinal direction of the cable, as well as the lateral sides of the outer jacket, facing perpendicularly to the longitudinal direction. This way, the strengthening member is placed in the area of, preferably covering the edge of the stripped-off outer jacket and is thereby arranged at that part of the cable jacket that is most susceptible to deformation under tensile load.

According to a further embodiment of the cable fixture assembly or the method of the present invention, at least a portion of the strengthening member may be positioned, in the longitudinal direction of the cable, between the reinforcement cover and the outer jacket. The longitudinal direction of the cable principally coincides with the pulling direction along which the tensile force is applied to the cable, when the cable is pulled on. This way, the strengthening member is covering the outer jacket at the position where the tensile load at its maximum, namely in the pulling direction.

For facilitating the fastening of the fold-back section of the stripped-off reinforcement cover and making it easier to loop the fold-back section around the strengthening member, in a further embodiment of the cable fixture assembly according to the present invention, the stripped-off reinforcement cover may be formed as at least one fixation tab. A tab in this respect has to be understood as a sheet-like or strip-like part or a cable, rope or string-like part of the reinforcement cover that is stripped off the core, yet remains connected to the remainder of the reinforcement cover. According to an embodiment of the method according to the present invention, the reinforcement cover stripped off the core is shaped, in sections, to at least one fixation tab. Such a fixation tab, the longitudinal dimension of which usually exceeds its width dimension several times, promotes a looping around because a tab can be easily handled and, due to its rather low width dimension, does not occupy much space, making it possible to use compact strengthening members.

A very robust, yet compact way of shaping the stripped-off reinforcement cover as a fixation tab is to shape it as a thread having a defined thread size. A thread having a substantially circular cross-section is compact, yet very resistant. Moreover, since commonly used materials of the reinforcement cover are composed fibres, such as aramide fibres like Travon or Kevlar, forming threads by bundling the fibrous material can easily be achieved, resulting in a very robust fixation tab having a predefined tear resistance.

According to a further embodiment of the method according to the present invention, a plurality of cables are arranged in predetermined alignment before the step of fastening the fold-back sections of the reinforcement cover of the cables to the cable carrier. This way, the plurality of cables, such as for example the cables of a splitter, are firstly arranged in the desired arrangement and subsequently fastened in said predetermined arrangement to the cable carrier, thereby ensuring the correct position of each cable with respect to the cable carrier and to one another. For arranging the plurality of cables, according to a further embodiment of the cable fixture assembly, the assembly may comprises at least one organising organ for arranging at least one, preferably more than one, cable at a predetermined position with respect to the cable carrier and/or the strengthening member and/or to one another. The organising organ may be a further component of the cable fixture assembly or, in a further embodiment according to the present invention, the strengthening member may be the organising organ, thereby reducing the total number of elements of the cable fixture assembly.

In a further embodiment, the organising organ, preferably a strengthening member formed as an organising organ, may comprise at least one seat for receiving a cable. Alternatively, the organising member may be provided with other means for keeping the cable in its predetermined position, such as a clamp, clip or any other type of holder. In one embodiment, the seat may be adapted for receiving the tip of the stripped-off outer jacket, thereby protecting the tip and thus the part of the cable jacket that is most susceptible to deformation under tensile load. This way, the strengthening member provides a double function, namely protecting of the tip of the outer jacket as well as keeping the cable at the predetermined position.

According to a further embodiment of the present invention, the organising organ, preferably the strengthening member formed as an organising organ, comprises at least one passageway, through which the core and the stripped-off reinforcement cover pass. Such passageway facilitates looping the stripped-off reinforcement cover around the strengthening member, since it already passes through the passageway, similar to a thread guide. In one embodiment, the passageway may be arranged at the seat of the organising member, thereby mounting the cable at the organiser very close to the position where the bare core is exposed, which is advantageous for keeping the core in the predetermined position.

According to a further embodiment of the present invention, the at least one organising organ may comprise an alignment member for supporting the fold-back section of the reinforcement cover. The alignment member may be designed as an alignment collar protruding from the at least one organising organ. In one embodiment, the alignment member, such as an alignment collar, may be designed with intersections, in which a part of the fold-back section of the reinforcement cover may be received for supporting the reinforcement cover. Thereby, the alignment member helps to keep the fold-back section of the reinforcement cover in its predetermined position at the at least one organising organ.

According to a further embodiment of the method according to the present invention, the stripped-off reinforcement cover is held in the fold-back position. According to an embodiment of the cable fixture assembly, the assembly may comprise at least one retainer for maintaining the stripped-off reinforcement cover, preferably the at least one fixation tab, folded back. This way, an unfolding of the reinforcement cover and deviation from its fold-back position, in which the reinforcement cover is to be fastened to the cable carrier, is avoided. In one embodiment, the retainer may be arranged at the strengthening member, so that the strengthening member fulfils the additional function of holding the fold-back reinforcement cover of the fastening section in position.

According to a further embodiment, the retainer of the cable fixture assembly may be an eye arranged at the strengthening member. Such an eye is a robust means which can be directly formed in the strengthening member. Furthermore, the design of the eye may be easily adapted to the configuration of the stripped-off reinforcement cover that is folded back, in particular if said cover is formed as a fixation tab.

For facilitating the threading of the fixation tab through the eye, the eye may be provided with an insertion access, which opens into a guideway. Such guideway facilitates the insertion of the stripped-off reinforcement cover, preferably formed as a fixation tab, through the insertion access into the eye.

In one embodiment, the guideway may be a funnel expanding with distance from the insertion axis. For example, the funnel may be formed by a V-shaped groove, the tip of which opens into the insertion access. The funnel may, in one embodiment, be arranged laterally with respect to the eye, so that the fixation tab is placed not from the front but from the side through the insertion access into the eye. According to a further embodiment, the inner width of the insertion access may be smaller than the width of the fixation tab, such as the thread size if the tab is formed as a thread. This way, the fixation tab, particularly in the form of a thread, can be pressed through the insertion access into the eye, where it snaps in place.

According to a further embodiment of the present invention, the fold-back section of the reinforcement cover may be fastened to a carrier by an adhesive. Generally, any type of adhesive may be used for forming the bonding. Preferably used are adhesives forming a solid mould, such as hot-melt adhesives.

According to a further embodiment, the cable carrier may comprise an injection opening for inserting the adhesive. The injection opening may open in an injection direction running transverse to the pulling direction. This way, the adhesive fastening the fold-back reinforcement cover may form a mould filling and hardening in the insertion opening as well. The mould may thus be provided with locking pins extending into and engaging the insertion opening in the pulling direction. This engagement increases in the retention force by locking the fastening mould of the adhesive to the housing.

According to a further embodiment, the cable fixture assembly may comprise two organising organs. These two organising organs may be arranged, along the longitudinal axis of a cable, spaced apart from each other, thereby further stabilising the cable in a predetermined position. Moreover, the free end of the fold-back section of the reinforcement cover may be arranged between the two organising organs. When filling the space between the two organising organs with an adhesive, firstly the fold-back section of the reinforcement cover is fastened to the housing and secondly, the two organising organs are kept in place by the adhesive. This way, the two organising organs define a fastening volume that is a mould to be filled with an adhesive.

The invention will now be described in more detail by way of example hereafter with reference to the accompanying drawings, which illustrate advantageous embodiments. The described embodiments are only possible configurations, in which the individual features may, however, as described above, be implemented independently of each other or be omitted. Corresponding elements illustrated in the drawings are provided with the same reference signs.

In the drawings:

FIG. 6 shows the third assembling stage of assembling the splitter as shown in FIG. 2, from a schematic perspective view;

FIG. 7 shows a schematic perspective view of the fourth stage of assembling the splitter of the embodiment shown in FIG. 2;

Figure 2:
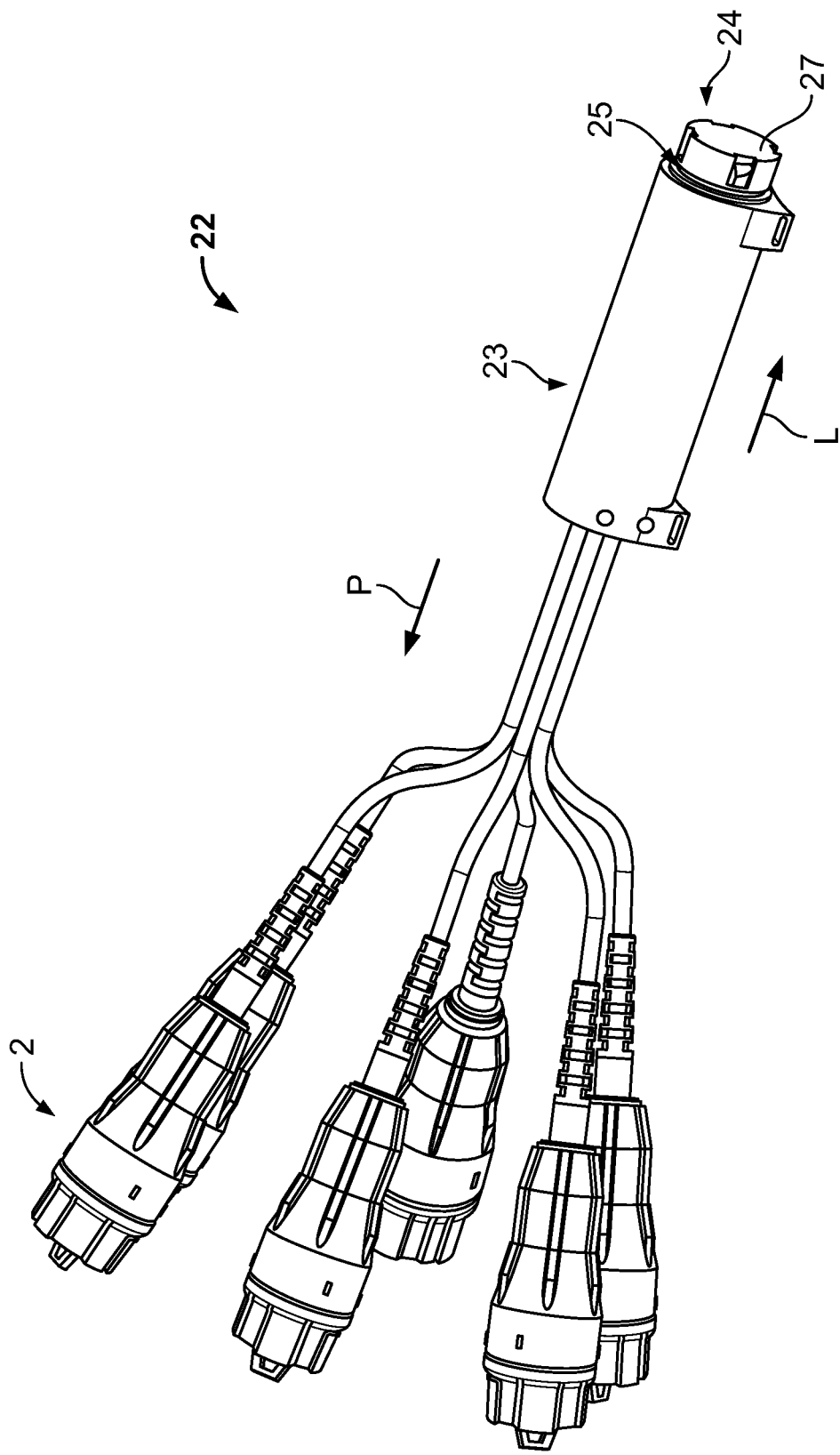
FIG. 2 shows a schematic perspective representation of a splitter according to the present invention.
Figure 8:
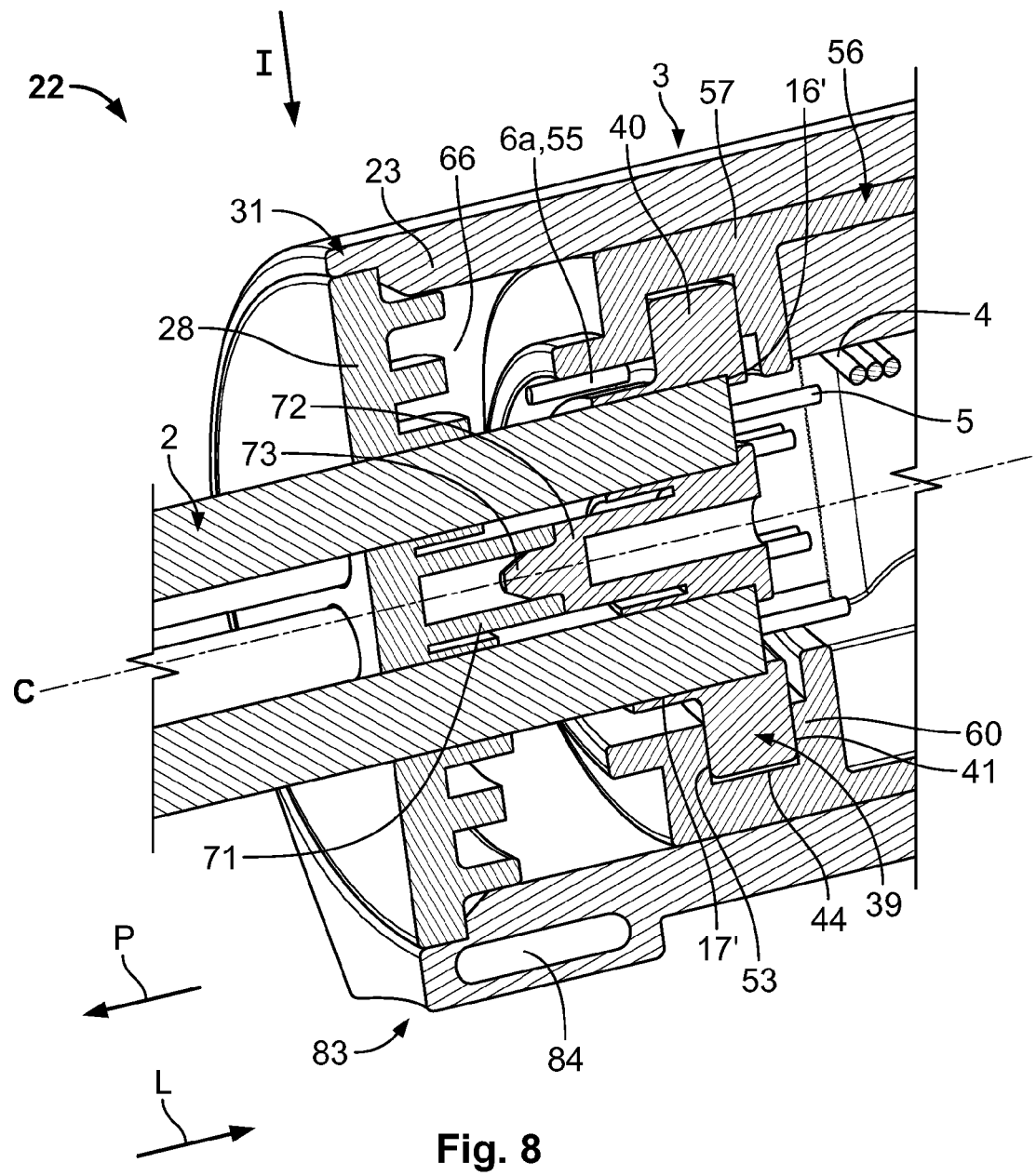
FIG. 8 is a cross-sectional representation of the cable terminal assembly according to the embodiment used in the splitter of FIG. 2, at the stage where the cable and the strengthening member are placed in their predetermined position with respect to the cable carrier housing, prior to the final assembling step of fastening the cable to the carrier.
Figure 9:
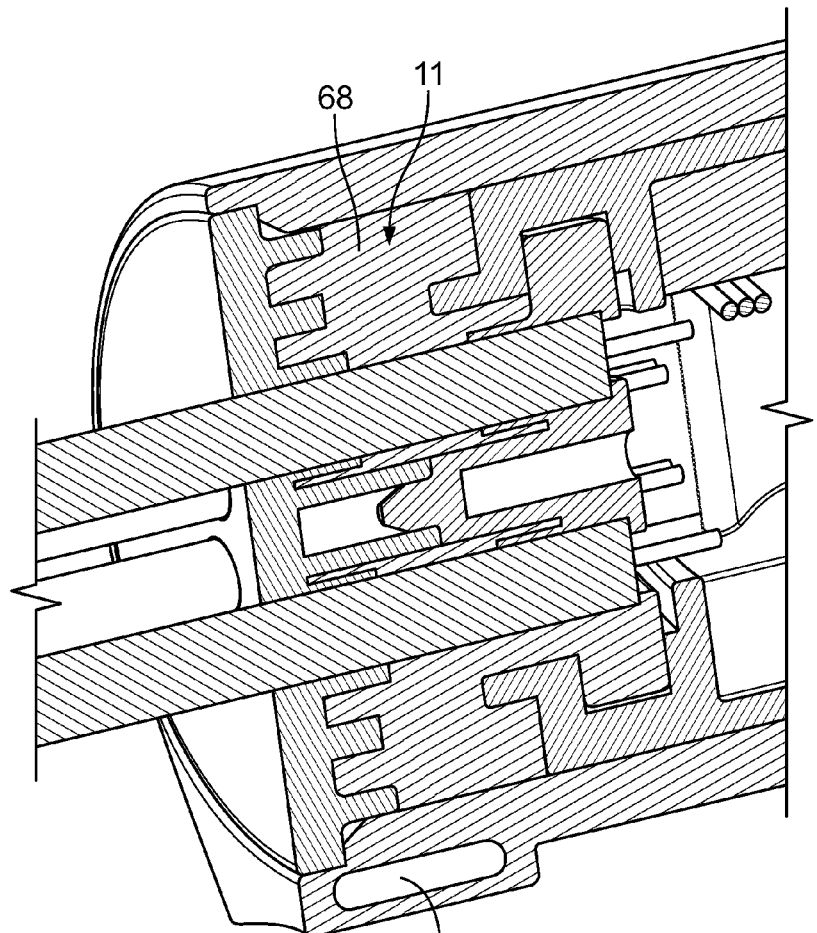
Figure 10:
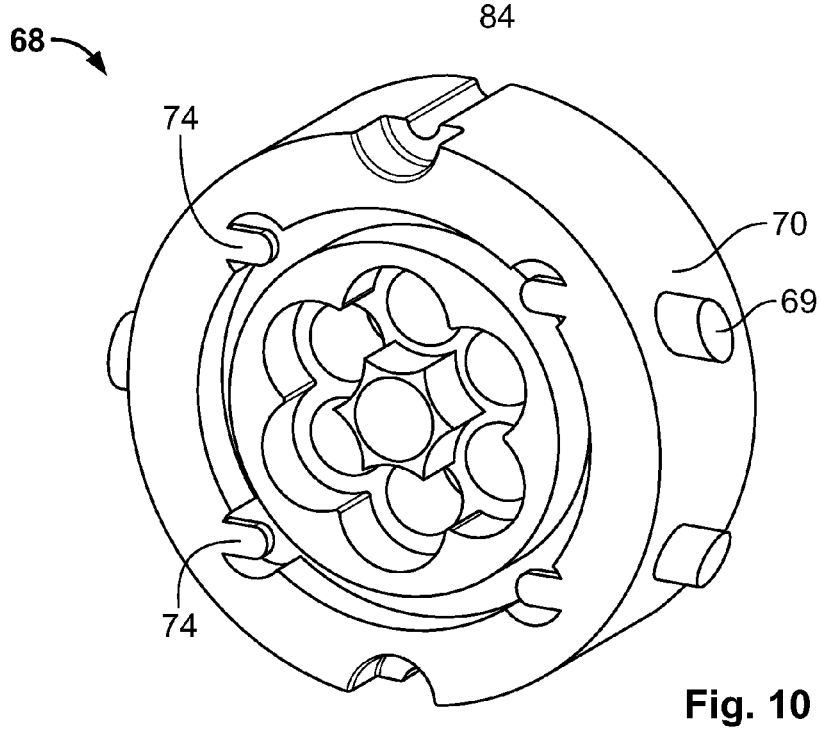
Figure 11A:
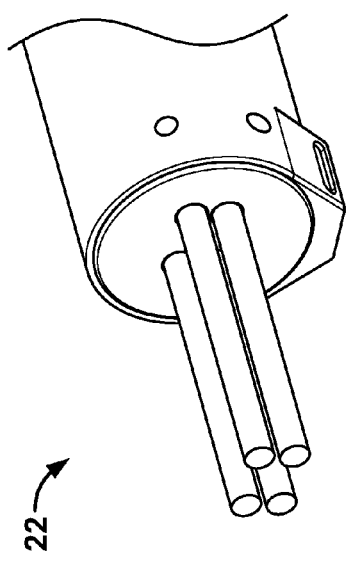
Figure 11B:
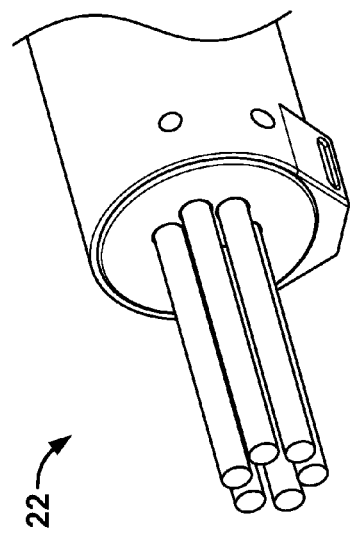
Figure 11C:
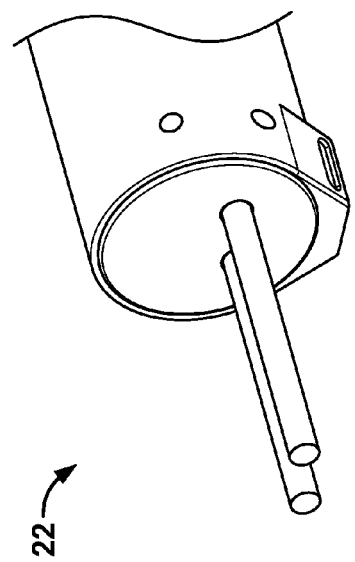
Figure 11D:
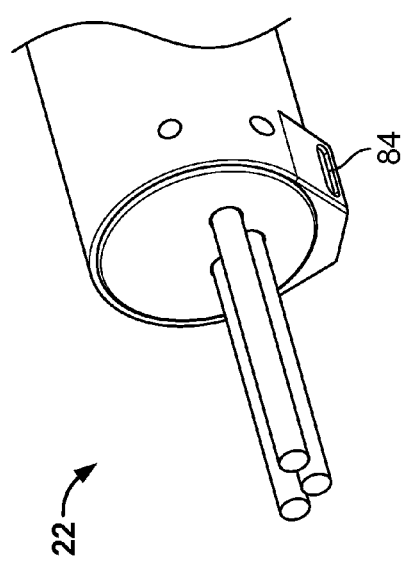
Figure 12:
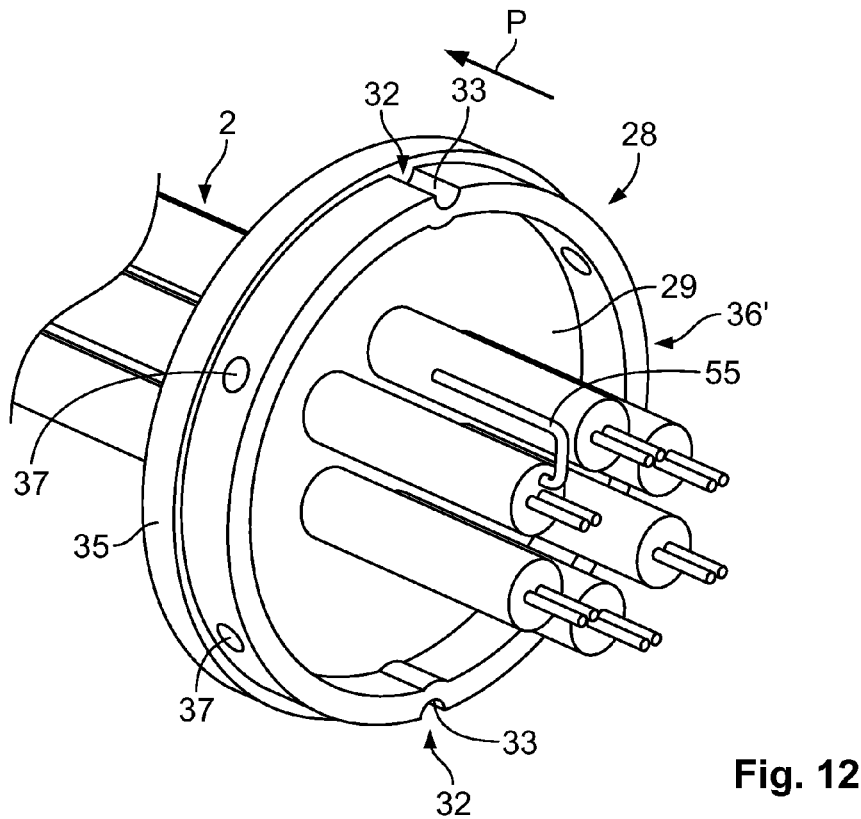
Figure 13:
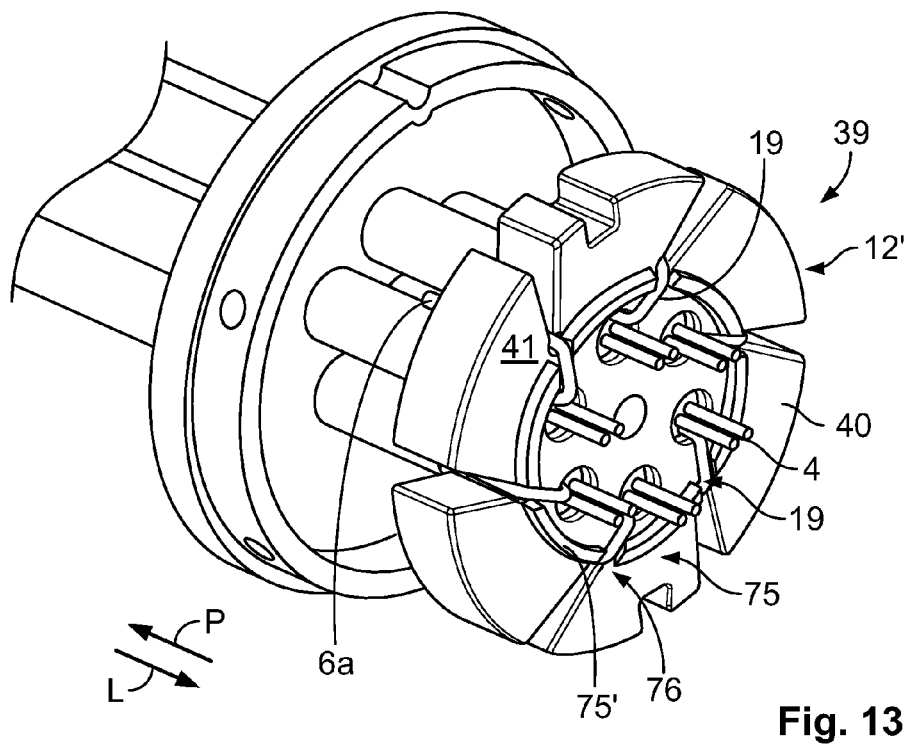
Figure 14:
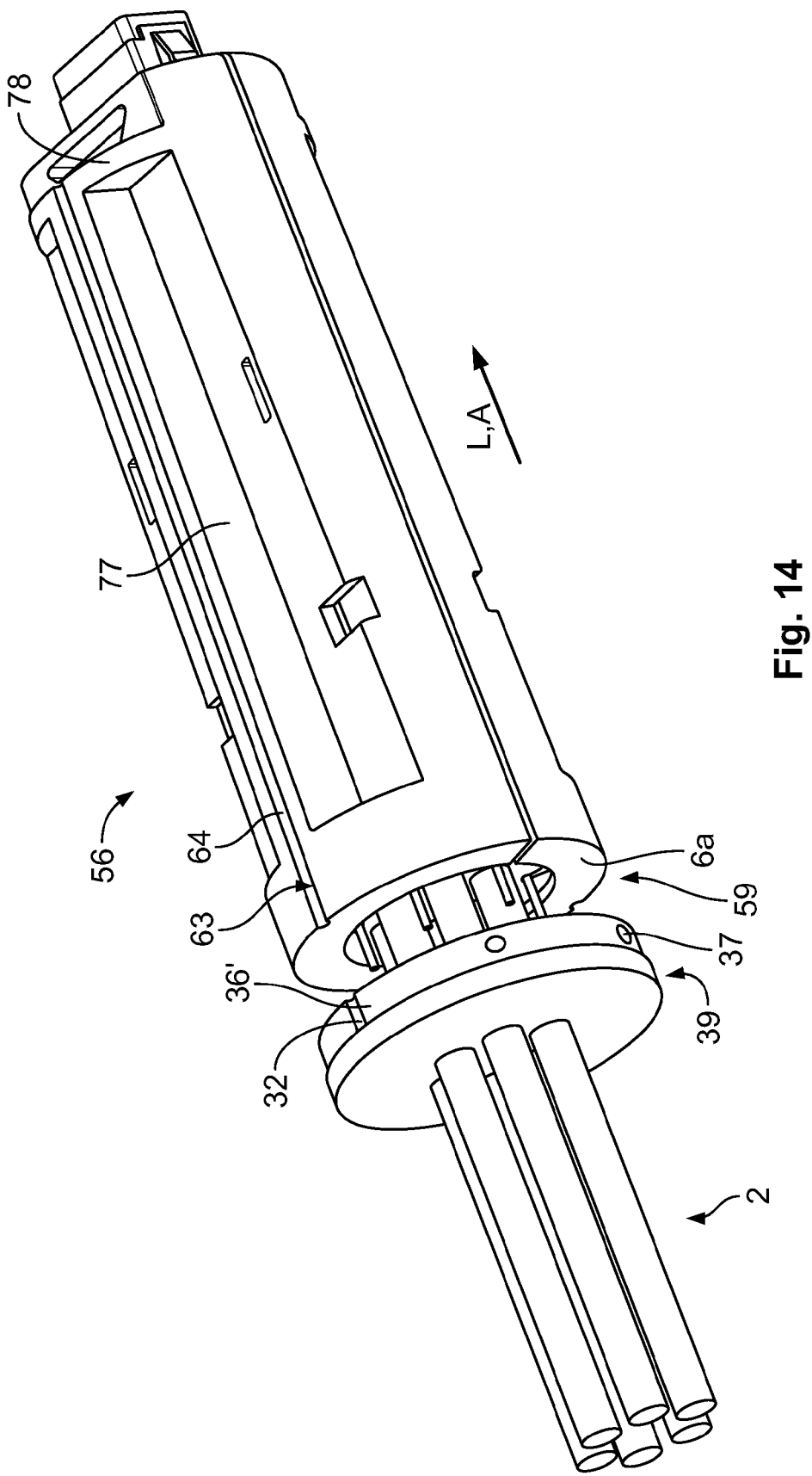
Figure 15B:
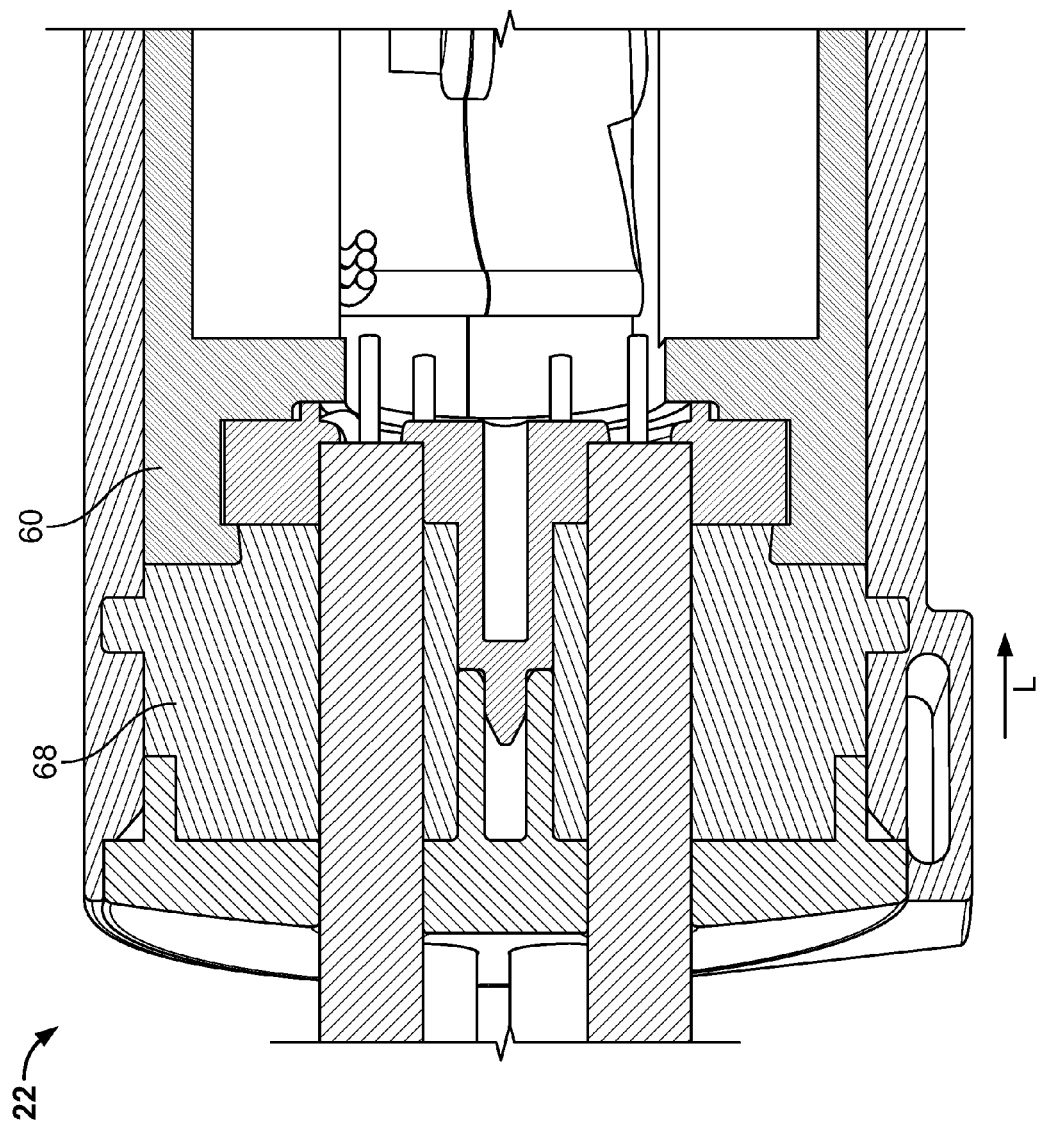
Figure 16:
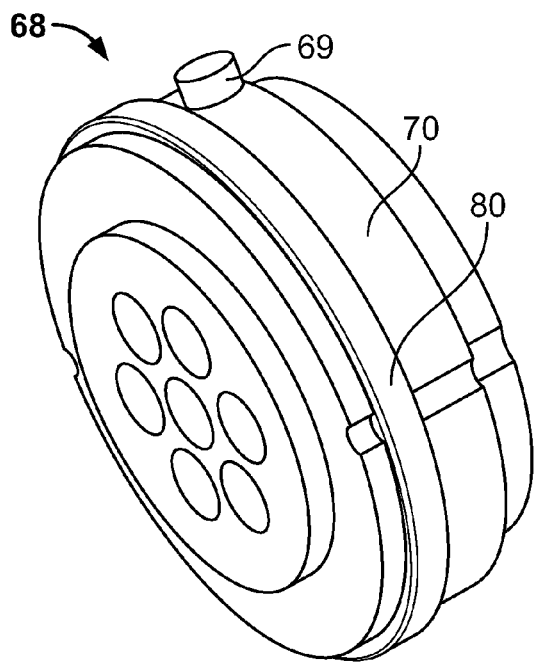
Figure 17:
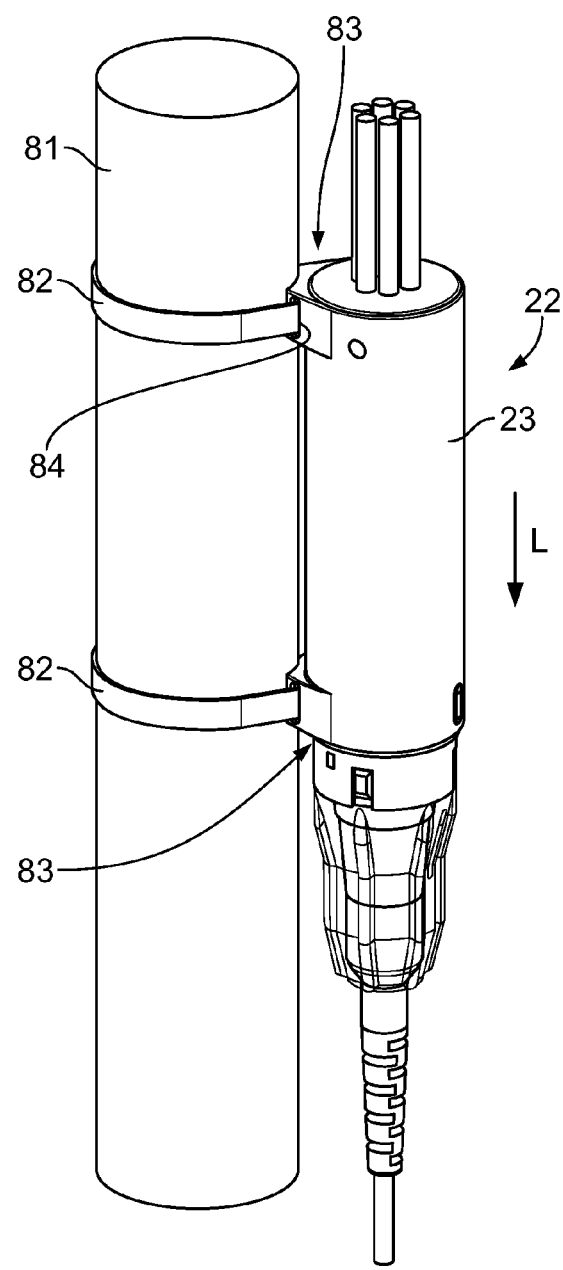

FIG. 9 corresponds to the representation of FIG. 8, after the adhesive fastening the cable to the carrier has been applied;

FIG. 10 is a schematic perspective representation of the adhesive mould body formed inside the cable carrier housing;

FIG. 11A is a schematic perspective representation of the splitter of FIG. 2 modified to use two cables;

FIG. 11B is a schematic perspective representation of the splitter of FIG. 2 modified for four cables;

FIG. 11C is a schematic perspective representation of the splitter of FIG. 2 modified for three cables;

FIG. 11D is a schematic perspective representation of the splitter of FIG. 2 modified for six cables;

FIG. 12 is a schematic perspective representation showing the first step of assembling, wherein an outer organiser according to a third embodiment is used;

FIG. 13 shows a schematic perspective view from the second step of assembling the cable fixture assembly of the splitter, shown from the front taken at an angle, with the outer organiser of FIG. 12 as well as a strengthening member according to a third embodiment;

FIG. 14 shows a schematic perspective view of the fourth stage of assembling the splitter, with the outer organiser of FIG. 12 as well as a transmission housing according to a third embodiment;

FIG. 15A is a cross-sectional representation of the cable terminal assembly according to the outer organiser and the strengthening member of the third embodiment as shown for example in FIG. 13, at the stage where the cable and the strengthening member are placed in their pre-determined position with respect to the cable carrier housing, prior to the final assembling stage of fastening the cable to the carrier;

FIG. 15B corresponds to the representation of FIG. 15A, after the adhesive fastening the cable to the carrier has been applied;

FIG. 16 is a schematic perspective representation of the adhesive mould body formed inside the cable carrier housing shown in FIG. 15B; and FIG. 17 shows a schematic perspective representation showing a way to assemble the splitter of the present invention on a support.

Figure 1:
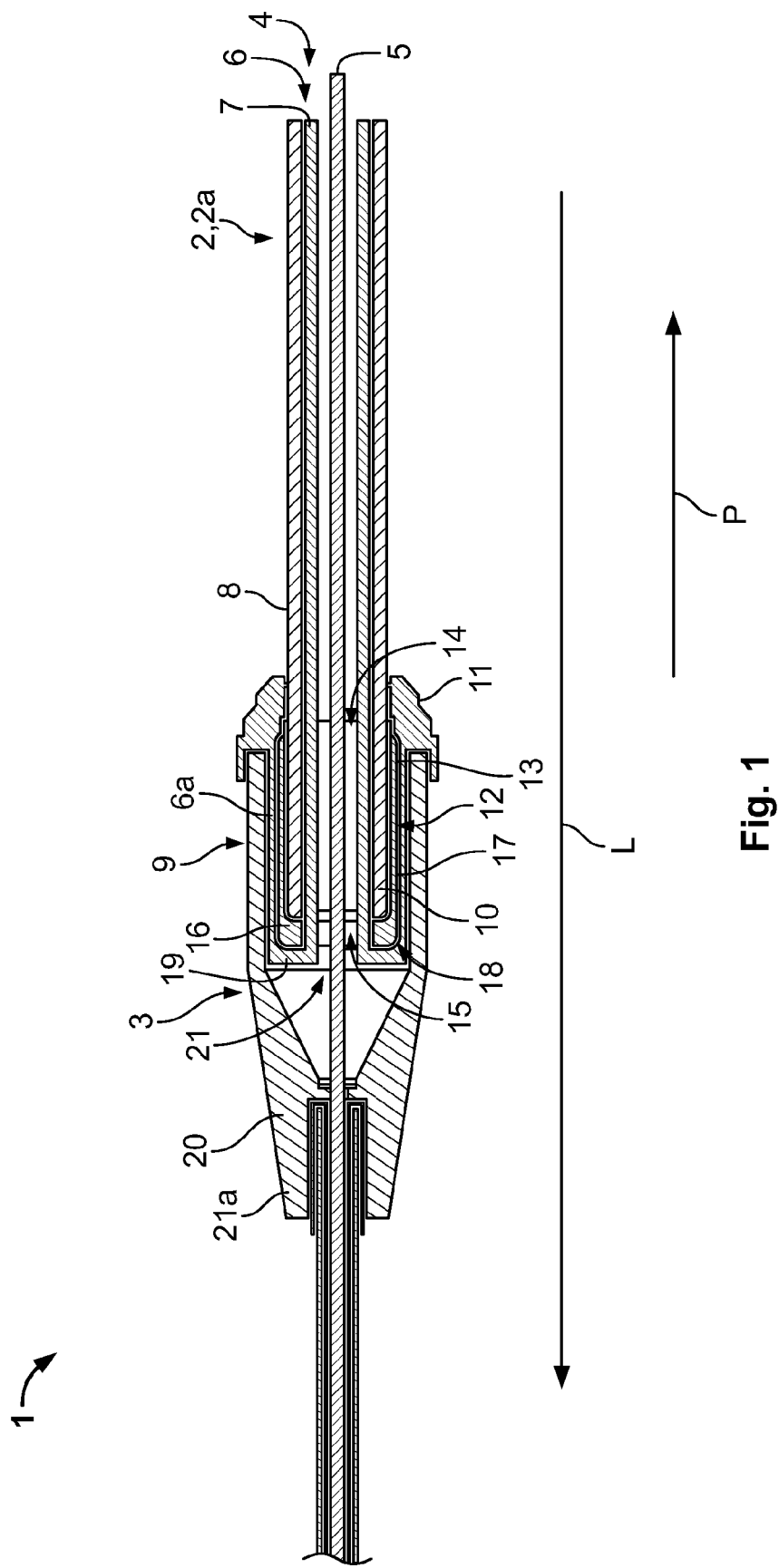
FIG. 1 shows a first embodiment of a cable fixture assembly according to the present invention shown as a schematic representation at a longitudinal cut.

FIG. 1 shows a cable fixture assembly 1 according to the invention, in a first embodiment, in a cross-sectional view taken along the longitudinal axis L of the cable 2 of the cable fixture assembly 1 that is fastened to the cable carrier 3 of the cable fixture assembly 1.

In the shown embodiment, the cable 2 is an optical fibre cable 2a that might be used for example in a standardised connector of fibre-to-the-antenna-technology. Even though, in the embodiment shown in FIG. 1 as well as the following embodiment shown in the subsequent figures, the present invention is demonstrated with respect to optical fibre cables, the cable fixture assembly 1 according to the present invention works with any type of optical and electrical cable used in a wide variety of applications, for examples connectors such as RJ45, USB, HDMI, or any other type of cable used in power and/or data transmission.

In FIG. 1, the assembled state of the cable fixture assembly 1 according to the first embodiment is shown, which will be explained in detail below.

The cable 2 has a core 4; in case of an optical fibre cable 2a, an optical fibre 5. In an electric cable, the core 4 would be the wire. Generally, the core 4 refers to the element which is actually transmitting the power and/or data in the cable 2. The cable 2 further comprises a reinforcement cover 6, which encapsulates and thus protects the core 4. In the optical fibre cable 2a shown in FIG. 1, the reinforcement cover 6 is made from a layer of a flexible fibre polymer 7, such as an aramide like Kevlar, placed around the optical fibre 5. The cable 2 further comprises an outer jacket 8.

The cable 2 is provided with a fastening section 9. The fastening section 9 is that part of the cable 2, which is arranged at and fastened to the cable carrier 3 in the cable fixture assembly 1. For providing the fastening section 9 and preparing the cable 2 for its fixture to the cable carrier 3, the reinforcement cover 6 and the outer jacket 8 are stripped off the core 4, at least in sections. The stripping off renders the core bare, thus makes it accessible for fusion or termination. Principally, a section of the outer jacket 8 is stripped off. This part of the jacket 8 is cut off and removed completely. The material of the reinforcement cover 6 is not removed completely from the cable 2. The tip 10 represents the cutting site, where the outer jacket 8 is cut off. A part of the reinforcement cover 6, called the stripped-off or fold-back section/part 6a, is stripped off the core 4, but remains coupled to the remainder of the reinforcement cover 6. The stripped-off section 6a is folded back against the longitudinal direction L over the outer jacket 8 at the area of the tip 10 of the outer jacket 8.

In a common cable fixture assembly (not shown), the cable 2 is placed with its fastening section 9, represented by the area of the cable 2, where the stripped-off reinforcement cover 6a is folded back, at a predetermined position, with respect to the cable carrier 3. Subsequently, the cable 2 is fastened to the cable carrier 3, usually by means of an adhesive 11. With the adhesive 11, at least the stripped-off reinforcement cover 6a, and optionally also the outer jacket 8, are fastened to the cable carrier 3. In such common cable fixture assemblies, when a tensile load is applied on the cable by pulling the cable 2 in a pulling direction P, the cable jacket 8 will deform at the tip 10 thereof, causing an overlength of the fibrous polymer 7 of the reinforcement cover 6.

For avoiding such deformation, according to the present invention, a strengthening member 12 is arranged in the fastening section 9, such that the fold-back section 6a of the reinforcement cover 6 is wrapped around the strengthening member 12.

In the embodiment of the cable fixture assembly 1 as shown in FIG. 1, the strengthening member 12 is designed as a bushing 13. The bushing 13 is provided with an entry opening 14, the inner width of which principally corresponds to the outer width of the outer jacket 8 of the cable 2. Hence, the cable 2 may be inserted through the entry opening 14 into the bushing 13 of the strengthening member 12 with all components, that is, the core 4, the reinforcement cover 6 and the outer jacket 8. At the other end of the bushing 13, which is opposite to the entry opening 14, the bushing 13 is provided with an exit opening 15. The inner width of the exit opening 15 is smaller than the inner width of the entry opening 14, and principally corresponds to the width of the cable without the outer jacket 8. This way, a cable 2, from which the outer jacket 8 has already been removed, may be inserted in the longitudinal direction L through the entry opening 14 into the bushing 13 and can be placed therein such that the tip 10 of the outer jacket 8 abuts against the collar 16 encircling the exit opening 15. The collar 16 protrudes from the casing 17 of the bushing 13 towards the inside of the bushing 13, thereby resulting in the decrease of inner width at the exit opening 15 compared to the entry opening 14 and the remainder of the bushing 13. This way, the bushing 13, which is the strengthening member 12 in the shown embodiment of FIG. 1, represents a seat 18 for receiving the fastening section 9 of the cable 2, which seat 18 may be used to arrange and organise the cable 2 at a predetermined position with respect to the cable carrier 3.

The inner width of the exit opening 15 is wide enough to allow the cable core 4 as well as the reinforcement cover 6 to pass therethrough. Thus, it is possible to strip off the reinforcement cover 6 from the core 4 and fold back the stripped-off section 6a such that it is placed on the outside of the casing 17 of the bushing 13. This way, the stripped-off section 6a of the reinforcement cover 6 is looped around the strengthening member formed by the bushing 13. In the shown embodiment, the stripped-off section 6a is wrapped around the seat 18 of the bushing 13, where the collar 16 adjoins the casing 17 of the bushing 13, the wrapping being in a direction that is principally perpendicular to the pulling direction P.

As can be seen in FIG. 1, the folding edge 19 of the fold-back section 6a borders the collar 16 of the bushing 13 such that, viewed along the longitudinal direction L, the collar 16 is placed between the tip 10 of the outer jacket 8 and the folding edge 19 of the reinforcement cover 6.

In the shown embodiment, the cable carrier 3 is a cable sleeve 20 having a receptacle 21 for receiving the cable 2 as well as a chute-shaped extension 21a for passing and mounting the bare core 4, wherefrom the reinforcement cover 6 and the outer jacket 8 have been stripped. The cable 2 is fastened to the carrier 3 by gluing the fold-back section 6a, as well as part of the bushing 13 in the area of the entry opening 14 and a part of the outer jacket 8 that lies outside the bushing 13 using an adhesive 11. The adhesive 11 is applied at the sleeve 20 in the area around the opening of the receptacle 21. By fastening using the adhesive 11, the cable fixture assembly 1 is completely assembled.

If one applies a tensile load at this cable fixation assembly 1 by pulling the cable 2 in the pulling direction P, the strengthening member 12 provides an improved resistance by protecting the outer jacket 8, in particular in the area at the tip 10 thereof, against deformation because the tensile load acting on the cable 2 will principally be absorbed and compensated for by the strengthening member 12. The peak of the tensile load acts from the folding edge 19 of the reinforcement cover 6 in the pulling direction P. At this position, the load is led into the collar 16 of the bushing 13, which is made from a material which is incompressible under a tensile load resulting from pulling the cable 2. The collar 16 thus protects the tip 10 of the outer jacket 8 and prevents a deformation thereof. In the shown embodiment, the tensile load acting in the pulling direction P at the collar 16 of the bushing 16 is deviated into the casing 17 of the bushing 13 and thereby deflected around the tip 10 of the outer jacket 8. Moreover, since the bushing 13 is also fastened to the sleeve 20, at its end with the entry opening 14, by the adhesive 11, a particularly strong fastening is achieved because the bushing 13 is kept in place, relative to the sleeve 20 by fastening it to the sleeve 20 via the adhesive 11.

This way, the cable fixation assembly 1 according to the present invention, comprising a strengthening member 12, around which the fold-back section 6a of the reinforcement cover 6 is looped, provides an improved resistance against withdrawal when a tensile load acts on the cable in the pulling direction P.

With reference to FIGS. 2 to 10, a second embodiment of the cable fixation assembly 1 according to the present invention will now be presented in the context of an embodiment of an inventive splitter comprising a plurality of cables 2, which are part of at least one cable fixture assembly 1 according to the present invention, as well as with regard to the inventive method of fastening at least cable 2 having a core 4, a reinforcement cover 6 for protecting the core 4 as well as an outer jacket 8, such as an optical fibre cable 2a, at a cable carrier 3.

In the following, the same reference numerals will be used for elements having the same design and/or function as elements used in the preceding embodiment.

FIG. 2 is a schematic perspective representation of a splitter 22 according to the invention. The splitter 22 comprises a plurality of cables 2, in the shown embodiment six cables 2. One end of these six cables 2 is fastened to the housing or box 23 of the splitter 22 by means of a cable fixture assembly according to the present invention. The other end of the cables 2 is provided with a connector as well as a sealing enclosure thereof, which is know for example from EP 2 302 431 A2. Such connectors are for example used in fibre-to-the-antenna connectivity. The splitter 22 of the present invention allows to route only a single cable from ground lever up the antenna. This cable can be coupled at the mating end 24 of the splitter 22, which is provided with a bulkhead 25, in a data and/or electricity-transmitting manner with a connector 26 of the splitter 22. In the embodiment shown in FIG. 2, the bulkhead 25 is covered with a protective cap 27, so that the details of the bulkhead 25 as well as the connector 26 thereof cannot be seen in FIG. 2.

At the other end of the splitter 22 that lies opposite to the connector 26 at mating end 24, the six cables 2 exit the box 23 of the splitter 22, which splits up and diverts the signals transmitted via the cable mated to the mating end 24 of the splitter 22 onto the six cables 2 of the splitter 22. This splitting is made close to the antenna. Hence, it is not necessary to route six separate cable assemblies from ground level to the antenna, but rather a single one, which is splitter close to the antenna by the splitter 22 shown in FIG. 2, whose six cables 2 are then connected to the antenna for the fibre-to-the-antenna process.

In the following, more details concerning the splitter 22 and the cable fixation assembly 1 thereof as well as the method for fastening a cable 2 at a cable carrier 3, such as the box 23 of the splitter 22, will be explained with reference to FIGS. 3 to 10 going successively through the steps of assembling the splitter 22.

Figure 3:
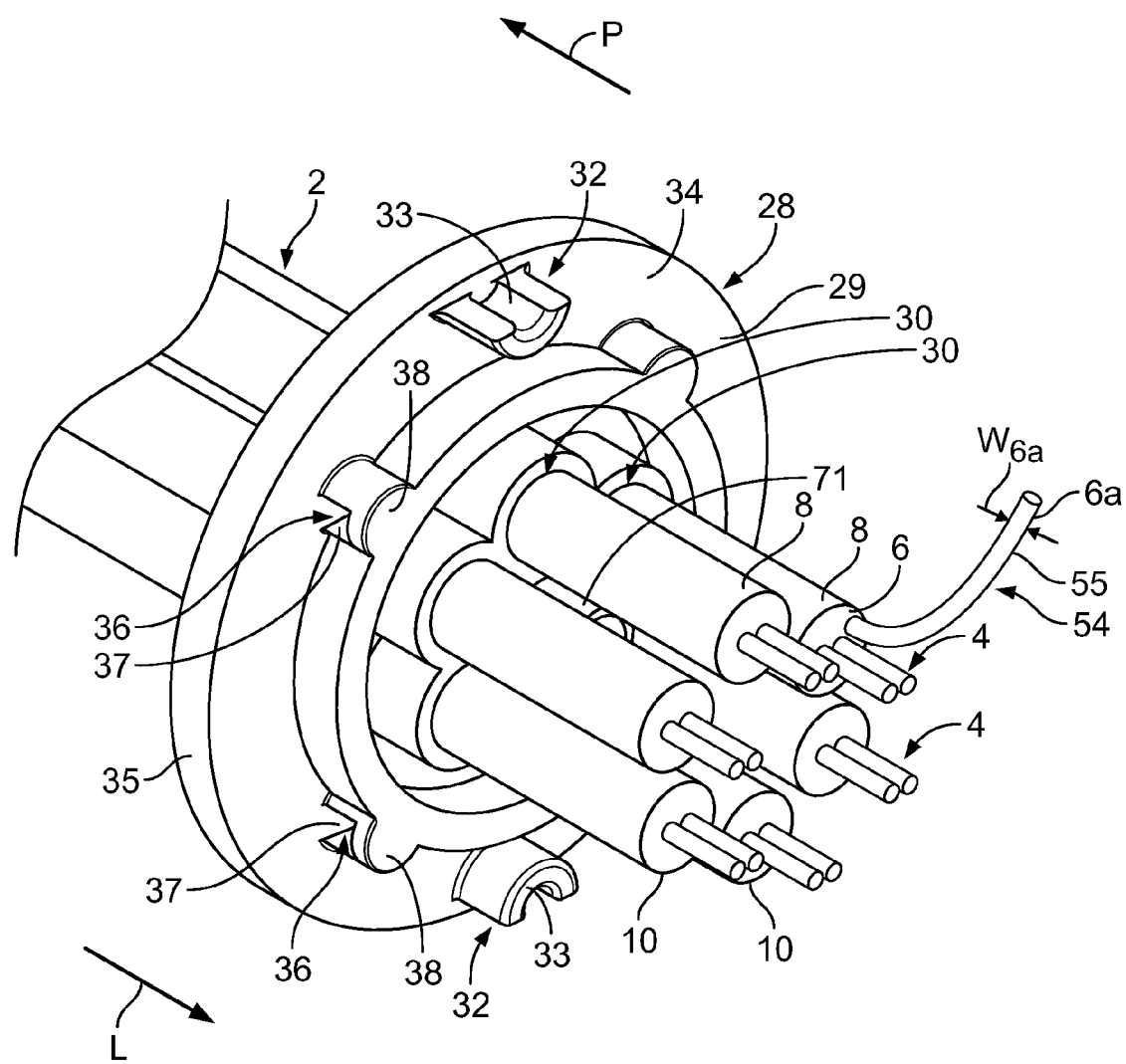
FIG. 3 is a schematic perspective representation showing the first step of assembling the splitter of FIG. 2.

FIG. 3 shows a first stage of the assembling process. In this stage, the six cables 2 of the splitter 22 are bundled, and arranged with respect to one another in a predetermined position using a first or outer organising organ 28. In the following, an organising organ 28 is also referred to as an organiser 28. The outer organiser 28 is principally composed from a disc-shaped body 29. In its central region, the outer organiser 28 is provided with an array of insertion holes 30. The insertion holes 30 are formed as through-holes extending through the disc-shaped body 29. The inner width of the insertion holes 30 principally matches the outer width of the cables 2 so that the cables may be inserted through the insertion holes 30 in a form-fit manner, yet being slidable in the longitudinal direction L, and thereby be arranged in a predetermined arrangement with respect to one another.

As will be explained in detail below, the outer organiser 28 has the further function of being a cap closing an insertion opening 31 (see for example FIG. 7), of the box 23 of the splitter 22, which box 23 is principally composed of a tubular sleeve.

The outer organiser 28 is furthermore provided with guiding means 32, which are designed as half-shell-formed protrusions 33 extending from the inner surface 34 of the disc-shaped body 29 in the longitudinal direction L and which are arranged, engaging their counterparts, inside the box 23 of the splitter 22, when the outer organiser 28 closes the insertion opening 31. The guiding members 32 ensure that the outer organiser 28 closes the opening 31 in the correct position, avoiding a disalignment of the outer organiser 28, in particular a rotational disalignment around the longitudinal axis L. In the shown embodiment of FIG. 3, two guide members 32 are arranged close to the outer circumference 35 of the outer organiser 28 symmetrically with respect to the centre C of the disc-shaped body 29.

The outer organiser 28 is furthermore provided with fastening sockets 36. The fastening sockets 36 are designed with a recess 37, which is covered in the longitudinal direction L by a stopper surface 38. Thus, as will be explained in detail below, after the adhesive 11 is applied, the mould 68 of the adhesive 11 will enter the recesses 37, thereby hooking and interlocking the stoppers 38. By this engagement, the outer organiser 28 is secured from being removed in the pulling direction P from the box 23 of the splitter 22.

The cables 2 are designed as duplex cables having a pair of cores 4, covered by a reinforcement cover 6, which in turn is surrounded by the outer jacket 8 of the cables 2. In FIG. 3, the cores 4 are already laid bare, that is, the outer jacket 8, ending a tip 10, is already stripped-off and removed from the cable 2. This tip 10 is placed and seated in a second, inner organising organ or organiser 39, at the next assembling stage.

Figure 4:
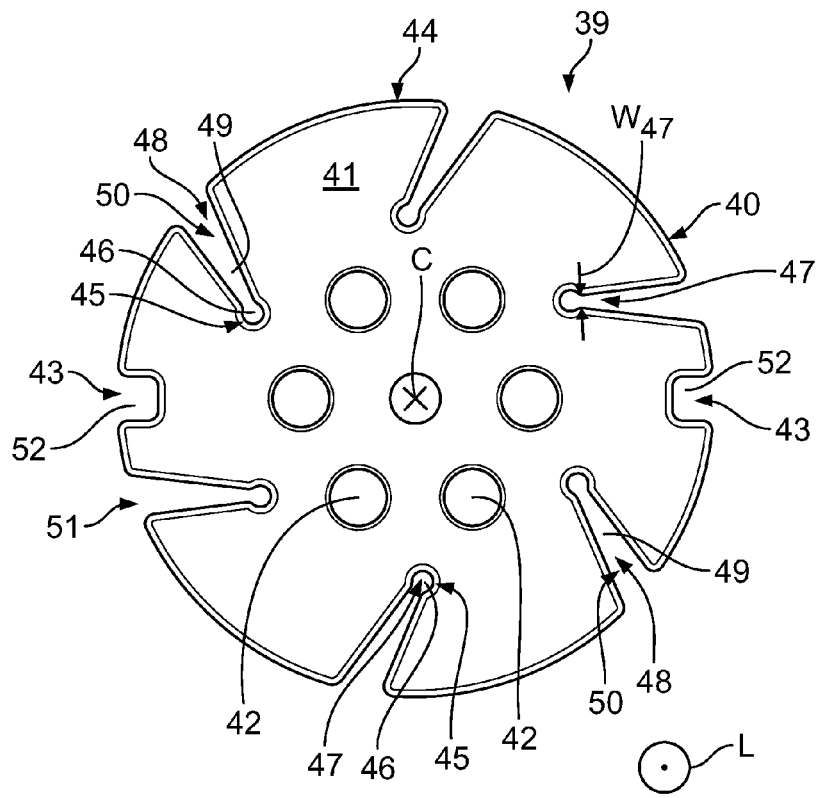
FIG. 4 shows a planar front view of a strengthening member used in the cable terminal assembly comprised in the splitter of FIG. 2.

The inner organiser 39, shown from the front in FIG. 4, is also made from a disc-shaped body 40. The front side 41 of the inner organiser faces in the longitudinal direction L in the assembled state.

As can be seen in FIG. 4, the inner organiser 39 comprises an array of passageways 42. The array of the passageways 42 of the inner organiser 39 matches with the array of insertion holes 30 of the outer organiser 29. However, the inner width of the passageways 42 is smaller than the inner width of the insertion holes 30 so that only the cores 4 as well as the stripped-off reinforcement cover 6a, in particular the section thereof that forms the fold-back section 6a, passes through. The remainder of the cable 2, in particular the tip 10 of the outer jacket 8, is too large to pass through the passageways 42.

This way, the passageways 42 of the inner organiser 39 correspond to the exit opening 15 of the bushing 13 according to the first embodiment shown in FIG. 1.

As will be explained in detail below, similar to the bushing 13 of FIG. 1, the inner organiser 39 of the second embodiment of the cable fixture assembly 1 is at the same time the strengthening member 12.

The inner organiser 39 further comprises guiding members 43 as well. The guiding members 43 of the inner organiser 39 are designed as alignment channels 52 forming a continuous groove through the disc-shaped body 40 of the inner organiser 39. The alignment channels 52 of the inner organiser 39 open into the outer circumference 44 of the inner organiser 39 and are, similar to the guiding members 32 of the outer organiser 28, arranged symmetrically with respect to the centre C of the disc-shaped body 40 of the inner organiser 39.

Figure 5A:
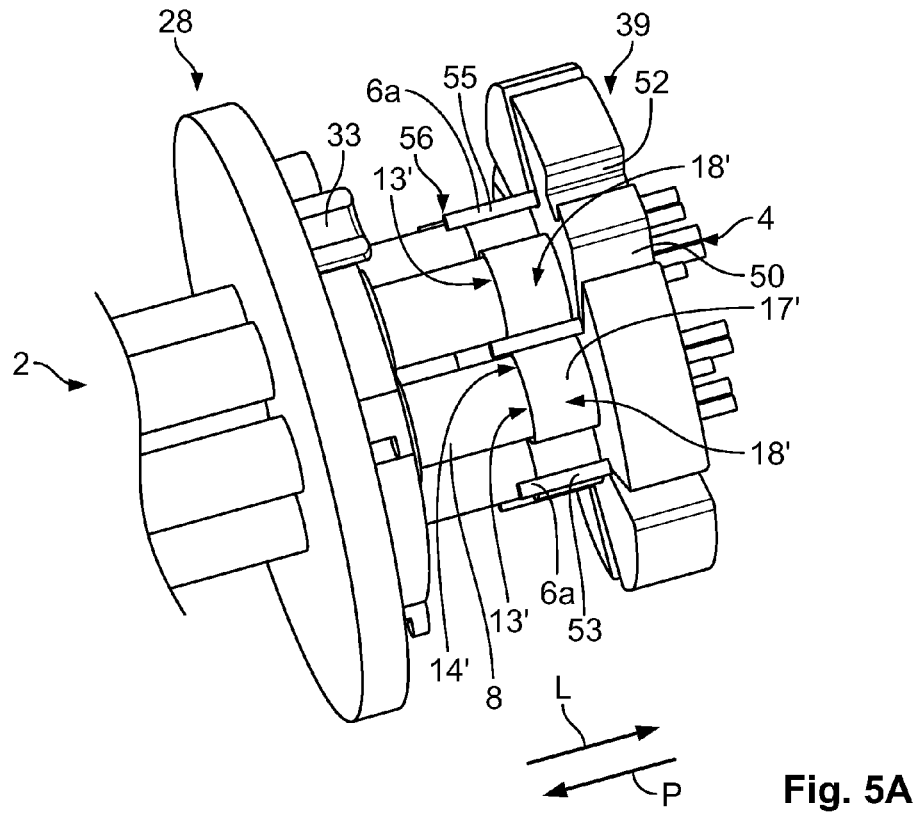
FIG. 5A shows a schematic perspective view from the second step of assembling the cable fixture assembly of the splitter shown in FIG. 2, taken from the back at an angle.
Figure 5B:
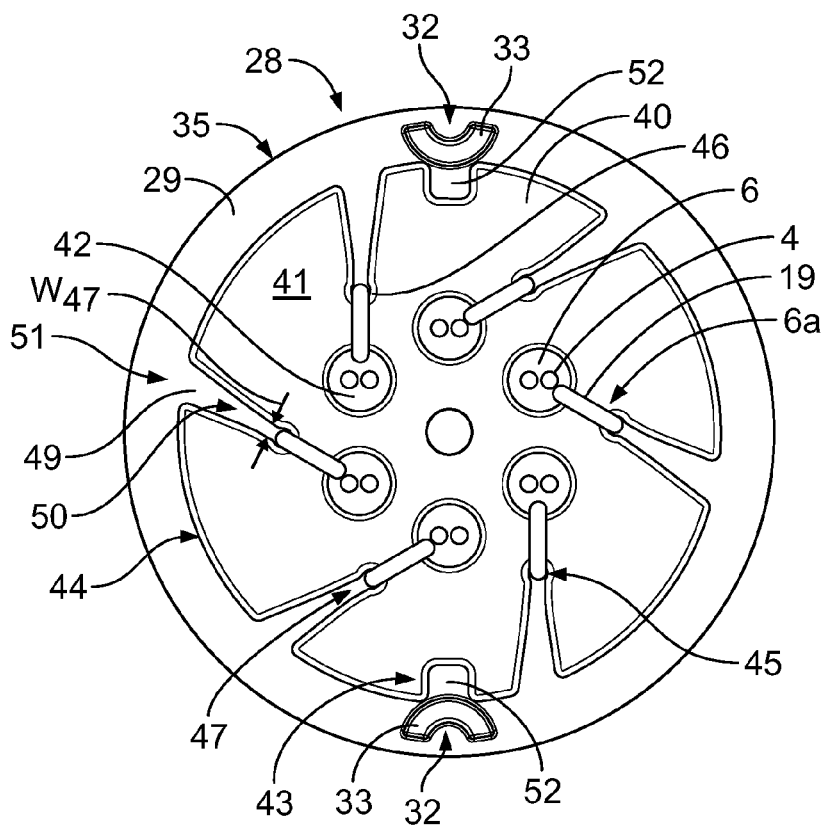
FIG. 5B shows a front view of the assembling stage as shown in FIG. 5A.
Figure 5C:
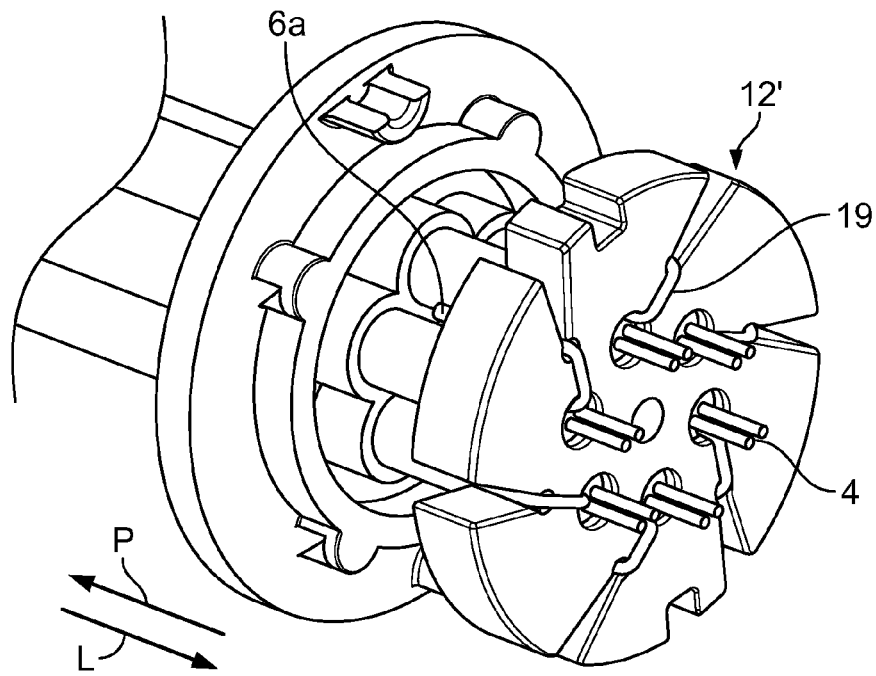
FIG. 5C shows the assembling stage of FIGS. 5A and 5B, shown from the front taken at an angle.

The inner organiser 39 furthermore comprises retainers 45 for maintaining the stripped-off reinforcement cover 6a in the fold-back position, as will be shown and explained in detail with respect to FIGS. 5A to 5C. In the shown embodiment, the inner organiser 39 comprises six retainers 45, wherein one retainer is assigned to one passageway 42.

In the shown embodiment, the retainers 45 are designed as an eye 46, extending through the disc-shaped body 40 of the inner organiser 39. The eyes 46 are principally composed of a circular through-hole. For facilitating the insertion of the stripped-off reinforcement cover 6a into the retainer 45, the eye 46 is provided with an insertion access 47. The insertion access 47 opens laterally, that is, principally perpendicularly to the through hole eye 46 that generally extends in the longitudinal direction L.

The insertion access 47 opens into a guideway 48. The guideway 48 is designed as a V-shaped groove forming a funnel 50, whereby the small funnel outlet falls together with the insertion access 47, and the outer introduction opening 51 disrupts the circumference 44 of the inner organiser 39. The shape of the V-groove 49, whose introduction opening 51 is wider than the exit opening at the insertion access 47 of the eye 46, allows the stripped-off reinforcement cover 6a to be easily inserted into the eye 46.

In the following, the next stage of the method for assembling the cable fixture assembly 1 according to the embodiment of the present invention shown in FIGS. 2 to 10 is explained with reference to FIGS. 5A to 5C.

In this stage, the inner organiser 39 is assembled with the cables 2, holding them in a predetermined position with respect to each other as well as to the inner organiser 39 forming the strengthening member 12 of this embodiment. Moreover, it can be seen in FIGS. 5A to 5C how the cores 4, laid free from the reinforcement cover 6 as well as the outer jacket 8, are exposed at the end of the cable 2 and the fold-back section 6a of the reinforcement cover 6 is looped around the inner organiser 39 forming the strengthening member 12 of this embodiment. How the fold-back sections 6a are maintained in their fold-back position by means of the retainer 45 of the organiser 39 is also depicted in FIGS. 5A to 5C.

As can best be seen in FIG. 5A, but also in FIGS. 8 and 9, the inner organiser 39 is provided with cable seats 18'. The cable seats 18' are similar in design to the seats 18 of the bushing 13 from the first embodiment. The opening of the passageway 42 at the front side of the inner organiser 39 corresponds to the exit opening 15 of the bushing in FIG. 1. At the rear side 53, the casings 17' of the seats 18' protrude against the longitudinal direction. Similar to the casings 17 of the embodiment shown in FIG. 1, the casings 17' of the inner organizer 39 have an entry opening 14', face against the longitudinal direction L, through which the cable might be inserted into the cable seats 18' of the inner organiser 39.

Since the inner organiser 39 of the shown embodiment is adapted for organising six cables 2, obviously the organiser 39 comprises six seats 18', one for receiving each one of the six cables 2. Each cable 2 is placed such that the tip 10 of the stripped-off outer jacket 8 abut against the collar 16' (see for example FIG. 8), encircling the passageway 42, while at the same time allowing passage of the bare cores 4 as well as the stripped-off part 6a of the reinforcement cover 6 through the passageway 42.

If the cables 2 are properly seated in the seats 18' of the inner organiser 39 such that the tip 10 of the outer jacket 8 abuts against the collar 16' of the bushing 13', in the next step of assembling the cable fixture assembly 1 the stripped-off section 6a of the reinforcement cover 6 is folded-back, thereby looping it around the strengthening member 12', which corresponds to the inner organiser 39.

In one embodiment, the stripped-off reinforcement cover 6a may be formed as at least one fixation tab 54. The term fixation tab is to be understood as at least a section of the stripped-off reinforcement cover 6a that is shaped for example like a lug, belt, strip or cable. In the embodiment shown in FIGS. 3 to 10, the stripped-off section 6a of the reinforcement cover 6 is shaped as a thread 55, which is composed of a bundle of the fibrous polymer 7, for example Kevlar, which constitutes the reinforcement cover 6. Depending on the material the reinforcement cover is made of, apart from bundling a part of the fibres into a thread, cutting the stripped-off reinforcement cover 6a into the desired form or another way to bring the stripped-off section 6a of the reinforcement cover 6 into the desired shape can be applied.

In the next assembling step, the thread 55 of the stripped-off section 6a of the reinforcement cover 6 is folded back against the longitudinal direction L, thereby looping it around the inner organiser 39. In the shown embodiment, the thread 55 is wrapped around the inner organiser such that the folding edge 19 thereof rests on that part of the body 40 of the inner organiser 39 that lies between the passageway 42 and the retainer 45, which is the eye 46.

For maintaining the thread 55 in the fold-back position, which can be seen in each of FIGS. 5A to 5C, the free end 56 of the thread 55 is introduced through the introduction opening 51 into the V-groove 49 representing a funnel 50 forming a guideway 48 to and through the insertion access 47 into the eye 46.

In the shown embodiment, the inner width $W_{47}$ of the insertion access 47 is smaller than the outer width or thread size $W_{6a}$ of the thread 55. Since the thread 55, composed of a bundle of fibrous polymer 7, is compressible, the thread 55 can be pressed through the insertion access 47 into the eye 46. As can be seen very well in FIG. 5A, the free end 56 of the thread 55 comes to rest in the space between the rear side 53 of the inner organiser 39 and the inner surface 34 of the outer organiser 28.

In this configuration, not only is the thread 55 maintained in the fold-back position, but also the inner organiser 39 is secured to the cables 2 properly placed in their seats 18' against falling off in the longitudinal direction L.

At this stage, the outer organiser 28 is slidable along and against the longitudinal direction L with respect to the cables 2, which facilitates the final stages of assembling the cable fixture assembly 1 as well as the splitter 22, as will be explained in detail below.

The next step of assembling the splitter 22 as shown in FIG. 2 is now explained with reference to FIG. 6. In this step, the assembly of the cables 2, properly arrayed by means of the inner organiser 39 as well as the outer organiser 28, is mounted on a transmission housing 56. The transmission housing 56 is composed of two housing half-shells 57, 57', which may be assembled to the transmission housing 56 by joining them and fastening them together, preferably using a re-openable snap-fit or force-fit joint.

The transmission housing 56 comprises a receiving end 58, at which the mating connector 26 is placed. This connector 26 is for coupling the splitter 22 with a cable (not shown), such as a cable routed from ground level up to an antenna. The connector 26 is placed into the shell 57 in its proper position, such that its mating face is directed outwardly and the data and/or electricity-transmitting elements, in the shown embodiment, optical fibre 5', are placed inside the transmission housing 56.

At the opposite end, the cable end 59 of the transmission housing 56, the assembly shown in FIGS. 5A to C is placed such that the inner organizer 39 is received inside the transmission housing 56 with the bare fibre cores 4 being directed and placed inside the transmission housing 56. In the transmission housing 56, the fibres 5 of the cables 2 are coupled with the fibres 5' of the connector 28. For properly placing the inner organiser 39 in the transmission housing 56, the housing shell 57, 57' is provided with a collar 60 that is adapted for receiving and form-fittingly engaging the disc-shaped body 40 of the inner organiser 39. In the assembled state, the collar 60 covers the outer organiser 39 from the front side 41, the rear side 53 as well as the outer circumference 44 thereof, resulting in a form-fit joint.

When the inner organiser 39 of the assembly shown in FIGS. 5A to C as well as the connector 26 are properly placed in the shell 57 of the transmission housing 56 and the fibre 5 of the cables 2 as well as the fibres 5' of the connector 26 are properly connected in a data and/or electricity-transmitting manner, the second half-shell 57', which principally resembles the other half-shell 57, is placed on top of the half-shell 57 for forming the transmission housing 56, as is shown in FIG. 7. For joining the two half-shells 57, 57 to the transmission housing 56, the half-shells 57 and 57' are provided at the seam with corresponding pins 61 and bores 62 forming a frictional joint.

The next stage of assembling the splitter 22 is shown in FIG. 7. In FIG. 7, the assembly comprising the transmission housing 56, in which the inner organiser 39 of the cable fixture assembly 1 is mounted is shown. The entire transmission housing 56 is inserted along an assembly direction A, which principally corresponds with the longitudinal direction L of the cables 2 through the insertion opening 31 into the box 23 of the splitter 22. For ensuring a proper assembly, the terminal housing 56 is provided at its outside with a pre-guiding 63, formed as a groove 64. The guiding groove 64 ensures, by interacting with a corresponding counterpart at the inside of the box 23 (which is not visible in the attached figures), that the transmission housing 56 is properly inserted into the box 23. For securing the transmission housing 56 to the box 23, the connector 26 is provided with locking lugs 65, which snap into corresponding locking grooves 65a designed at the bulkhead 25 of the box 23.

In the penultimate stage of assembling the splitter 22 as well as the cable fixation assembly 1 of the second embodiment, the outer organiser 28 is slid along the cables 2 in the longitudinal direction L until it fits into and thereby closes the insertion opening 31 of the box 23. This way, the outer organiser 28 closes the opening 31 of the box 23 of the splitter 22, at the side where the cables 2 are arranged.

FIGS. 8 and 9 illustrates a cross-sectional representation of the splitter 22, in particular a cut-off of the splitter 22 showing the cable 2 assembled with the organizers 28, 39 as placed in the box 23 and their transmission housing 56, before and after the final assembling stage. In the final stage, the adhesive 11 is used to fasten the cables 2, in particular the stripped-off sections 6a of the reinforcement cover 6 to the cable holder 3, here to the box 23 of the splitter 22.

As shown in FIG. 8, a fastening volume 66 to be filled with adhesive 11 is defined inside the box 23. In the longitudinal direction L, the fastening volume 66 is defined by the cable end 59 of the transmission housing 56 as well as the rear side 53 of the inner organiser 39. Against the longitudinal direction L, which corresponds to the pulling direction P, the fastening volume 66 is defined by the inner surface 35 of the outer organiser 28. In the direction transverse to the longitudinal direction L, the fastening volume 66 is defined by a section of the inner wall of the housing 23.

The housing 23 is provided with injection openings 67 (see FIG. 7), designed as through-holes in the housing 23 opening into the fastening volume 66. Via the injection openings 67, the adhesive 11 can be introduced into the fastening volume 66. Through these injection openings 67, the adhesive 11, such as a hot-melt adhesive, may be injected in an injection direction I, which is perpendicular to the longitudinal direction L, directly into the fastening volume 66 of the housing 23. The adhesive 11 may be injected using low-pressure injection, potting or normal injection. After the adhesive 11 has hardened, it forms an adhesive mould 68 which corresponds to the fastening volume 66 as well as the volume of the injection openings 67, since, during the injection, the adhesive 11 in the liquid state fills up the complete fastening volume 66 as well as the injection holes 67. The shape of the adhesive mould 68 can be seen in a cross-sectional representation in FIG. 9 and in a perspective view in FIG. 10. FIG. 10 shows that the adhesive 11 that hardens in the injection holes 67 forms locking pins 69 at the outer circumference 70 of the adhesive mould 68. These locking pins 69 are insofar advantageous as they provide a high retention force by being engaged in the injection holes 67 in a direction perpendicular to the pulling direction P. FIG. 10 also depicts the retention hooks 74 of the adhesive mould 68, which are formed by the adhesive 11 upon filling the recesses 37 of the fastening socket 36 of the outer organiser 28. These hooks 74 engage with the recesses 37 and secure the outer organiser 28 against removal from the box 23.

The outer organiser 28 and the inner organiser 39 are aligned and centred along the longitudinal axis L. This centring is achieved in that the inner surface 34 of the outer organiser 28 is provided with a centring sleeve 71. The sleeve 71 protrudes in the longitudinal direction L from the inner surface 34. The centring sleeve 71 is arranged at the centre C of the disc-shaped body 29, when the outer organizer 28 is properly placed closing the insertion opening 31. The centring sleeve 71 extends, as can also be seen in FIG. 3, further than the part forming the insertion holes 30, so that the tip of the centring sleeve 71, with respect to the longitudinal direction L, is foremost part of the outer organiser 28.

The inner organiser 39 is designed with a corresponding centring pin 72, protruding at the centre of its rear side 53 against the longitudinal direction L. The tip of the centring pin 72 facing against the longitudinal direction L is designed with a spur 73, which can be inserted, in the pulling direction P, into the centring sleeve 71 of the outer organiser 28. This way, the inner organiser 39 as well as the outer organiser 28 are properly aligned and centred with respect to one another.

Further, in FIGS. 11A to 11D, modifications of the splitter 22 according to the embodiment of the present invention shown in FIGS. 2 to 10 are depicted. This embodiment shows different modifications of the splitter 22 having two cables (FIG. 11A), four cables (FIG. 11B), three cables (FIG. 11C) or six cables (FIG. 11D), the later corresponding to the embodiment shown in FIGS. 2 to 10, is used.

In FIGS. 12 to 16, a third embodiment of a cable fixture assembly 1 according to the present invention is shown. The cable fixture assembly 1 of the third embodiment principally corresponds to the cable fixture assembly 1 of the second embodiment as shown in FIGS. 2 to 10. However, the outer organiser 28, the strengthening member 12, which at the same time is the inner organiser 39 of the third embodiment as well, the transmission housing 56; and the cable carrier 3, namely the housing 23 of the splitter, are slightly modified in the third embodiment compared to the second embodiment of the cable fixture assembly 1.

In the following, the same reference numerals will be used for elements having the same or similar structure and/or function in the cable fixture assembly 1 of the third embodiment as the corresponding elements of the second embodiment of the cable fixture assembly 1. In the following, only the differences of the elements of the third embodiment, compared to the ones of the second embodiment, will be described in detail.

FIG. 12 shows a first stage of the assembling process of the cable fixture assembly 1 according to the third embodiment, and principally corresponds to FIG. 3 showing the similar assembling step with respect to the cable fixture assembly 1 according to the second embodiment. The first or outer organiser 28 of the third embodiment, like the one of the second embodiment, comprises guiding members 32 as well as a fastening socket 36' with recesses 37. In the third embodiment, the fastening socket 36' is designed as a collar protruding from the disc-shaped body 29 of the outer organiser 28, close to the outer circumference 35 of said body 29. The two guiding members 32 are of a similar design as the ones of the second embodiment shown in FIG. 3, however, the guiding members 32 of the outer organiser 28 according to the third embodiment are integrated in the fastening socket 36'. Moreover, the recesses 37 in the third embodiment are designed as through-holes in the collar-shaped fastening socket 36', which through-holes 37 substantially run perpendicular to the pulling direction P.

FIG. 13 shows the assembling stage of the cable fixture assembly 1 according to the third embodiment, and principally corresponds to FIG. 5C of the previous embodiment. The inner organiser 39 of the third embodiment, which also represents the strengthening member 12' of the third embodiment cable fixture assembly 1, principally corresponds to the strengthening member 12' of the second embodiment as shown in FIGS. 4 and 5C. The inner organiser 39 of the third embodiment comprises an alignment member 75 for supporting the fold-back section 6a of the reinforcement cover 6. The alignment member 75, in the embodiment shown in FIG. 13, is designed as an alignment collar 75' at the front side 41 of the inner organiser 39. The alignment collar 75' circularly protrudes at the front side 41 from the disc-shaped body 40 of the inner organiser 39 and is designed with intersections 76, which coincide with the eyes 46 of the inner organiser 39. The intersections 76 support the fold-back sections 6a, in particular the folding edge 19 of the reinforcement cover 6, which is placed in said intersections 76 of the alignment member 75/alignment collar 75'.

FIG. 14 shows the stage of assembling the cable fixture assembly 1 of the third embodiment at the assembling stage corresponding to FIG. 7 of the second embodiment. The transmission housing 56 of the third embodiment principally corresponds to the transmission housing 56 of the second embodiment. The pre-guiding 63 at the outside of the terminal housing 56, which groove is designed on top of a guiding wall 77, is modified in the third embodiment, at the end of the guiding wall 77 facing in the longitudinal direction L, with reinforcement arcs 78. The reinforcement arcs 78 support the guiding wall 77 and further provide a coding face facilitating the insertion of the transmission housing 56 into the housing of the splitter. The collar 60 of the transmission housing 56 according to the third embodiment is adapted for receiving and form-fittingly engaging the disc-shaped body 40 of the inner organiser. At the cable end 59, the collar 60 according to the third embodiment is reduced such that it allows the form-fitting engagement on one hand and, on the other hand, allows maximum exposure of the fold-back section 6a of the reinforcement cover 6. This design improves the fastening of the reinforcement cover 6 to the cable carrier.

FIGS. 15A and 15B illustrate a cross-sectional representation of the splitter 22 with the cable fixture assembly 1 according to the third embodiment, in particular a cut-off of the splitter 22 showing the cable 2 assembled with the organiser 28, 39, as placed in the box 23 and the transmission housing 56, before and after the final assembling stage. FIGS. 15A and 15B of the third embodiment correspond to FIGS. 8 and 9 of the second embodiment.

According to the third embodiment, the housing 23 of the splitter 22 is provided with a retention groove 79. The retention groove 79 is designed circumferentially at the inside of the housing 23 such that the fastening volume 66 also encompasses the retention groove 79.

In the final stage, the adhesive 11 is used to fasten the cables, in particular the strip-off sections 6a of the reinforcement cover 6 to the cable holder 3. After the adhesive 11 has hardened, it forms an adhesive mould 68, which corresponds to the fastening volume 66 as well as the volume of the injection openings 67 and the volume of the retention groove 79 in the third embodiment.

The shape of the adhesive mould 68 of the third embodiment is shown in FIG. 16. The adhesive mould 68 comprises, in addition to the locking pins 69, a locking flange 80, which circumferentially protrudes from the outer circumference 60 of the adhesive mould 68. The locking flange 80 corresponds to the space of the retention groove 79. This way, the retention of the adhesive mould 68 in the fastening volume can be further improved.

Finally, one way of fixing the housing 23 of the splitter 22 of the present invention on a support 81, such as a pole, is depicted in FIG. 17. In the embodiment shown in FIG. 17, the splitter 22 is fastened on the supporting pole 81 by means of straps 82. The straps 82 are wound around the pole 81 and fixed to fixation members 83 of the splitter 22. In the shown embodiment, two straps 82 are used. The fixation members 83 are, with respect to the longitudinal direction L, at opposing ends of the housing 23 and each fixation member 83 comprises at least one, in the shown embodiment, two, fixation slots 84, through which slots 84 the straps 82 run. For allowing a good fixation of the fixation members 83 to the support 81, the area of the fixation member 83 that comes into contact with the support might have a contour, in the shown embodiment, a radius corresponding to the radius of the pole, to improve the fixation.

One advantage of the cable fixture assembly 1 as well as the splitter 22 of the present invention is that the only modification to be made for building each of the modifications shown in FIGS. 11A to 11D is that a different inner 39 and outer organiser 28 having a properly adapted array of insertion holes 31 and seats 18', need to be used, while the way of assembling the splitter 22 and all other components thereof are the same in all of the different modifications.

Even though the cable fixture assembly 1 as well as the splitter 22 according to the present invention is disclosed in the exemplary embodiments shown in the figures with respect to optical fibre technology, the cable fixture assembly 1 can also be used in devices comprising an electrical cable. The cable fixture assembly of the present invention is not limited to its application in a splitter, but can be applied in any device and component where a cable needs to be securely, and with high resistance against tensile load, be fastened to a cable carrier.

The invention claimed is:

1. Cable fixture assembly for fastening at least one cable at a cable carrier, said assembly comprising:
the cable having a core, a reinforcement cover for protecting the core as well as an outer jacket, wherein the reinforcement cover and the outer jacket are stripped off the core, at least in sections, and the stripped-off reinforcement cover is folded back; as well as the cable carrier, to which the cable is fastened with the fold-back section of the reinforcement cover, and
a strengthening member, around which the fold-back section of the reinforcement cover is looped, wherein at least a portion of the strengthening member is positioned, in the longitudinal direction (L) of the cable, between the reinforcement cover and the outer jacket.

2. Cable fixture assembly according to claim 1, wherein the strengthening member is arranged at the tip of the stripped-off outer jacket.

3. Cable fixture assembly according to claim 1, wherein the stripped-off reinforcement cover is formed as at least one fixation tab.

4. Cable fixture assembly according to claim 3, wherein the fixation tab is shaped as a thread having a defined thread size (W6a).

5. Cable fixture assembly according to claim 3, wherein the cable fixture assembly comprises at least one retainer for maintaining the at least one fixation tab, folded back.

6. Cable fixture assembly according to claim 1, wherein the assembly comprises at least one organising organ for arranging at least one cable at a predefined position with respect to the cable carrier, the strengthening member and/or to one another.

7. Cable fixture assembly according to claim 6, wherein the at least one organising organ comprises an adjustment member, for supporting the fold-back section of the reinforcement cover.

8. Cable fixture assembly according to claim 1, wherein the cable fixture assembly comprises at least one retainer for maintaining the stripped-off reinforcement cover folded back.

9. Cable fixture assembly according to claim 8, wherein the retainer is an eye arranged in the strengthening member, which opens into a guideway facilitating the insertion of the stripped-back reinforcement cover through the insertion access into the eye.

10. Cable fixture assembly according to claim 9, wherein the guideway is a funnel expanding with increasing distance from the insertion access.

11. Cable fixture assembly according to claim 10, wherein the inner width (W47) of the insertion access is smaller than the thread size (W6a) of the thread.

12. Cable fixture assembly according to claim 8, wherein the retainer is an eye arranged in the strengthening member, the eye being provided with an insertion access, which opens into a guideway facilitating the insertion of the stripped-back reinforcement cover through the insertion access into the eye.

13. Cable fixture assembly according to claim 1, wherein the fold-back section of the reinforcement cover is fastened to the cable carrier by an adhesive.

14. Cable fixture assembly according to claim 13, wherein the cable carrier comprises an injection opening for inserting the adhesive, which injection opening opens in an injection direction (I) running transverse to the longitudinal direction (L).

15. Cable fixture assembly according to claim 1, wherein the assembly comprises at least one organising organ for arranging more than one cable at a predefined position with respect to the cable carrier, the strengthening member and/or to one another.

16. Cable fixture assembly according to claim 15, wherein the at least one organising organ comprises an adjustment member designed as an alignment collar with intersections, for supporting the fold-back section of the reinforcement cover.

17. A splitter comprising a plurality of cables wherein by comprising at least one cable fixture assembly according to claim 1.

18. A method of fastening at least one cable having a core, a reinforcement cover for protecting the core as well as an outer jacket, at a cable carrier, the method comprising the steps of:

stripping the reinforcement cover and the outer jacket off the core, at least in sections;

folding back the stripped-off reinforcement cover; and fastening the fold-back section of the reinforcement cover to the cable carrier;

looping the fold-back section of the reinforcement cover around a strengthening member; and arranging the strengthening member at the tip of the stripped-off outer jacket.

19. Cable fixture assembly for fastening at least one cable at a cable carrier, said assembly comprising:

the cable having a core, a reinforcement cover for protecting the core as well as an outer jacket, wherein the reinforcement cover and the outer jacket are stripped off the core, at least in sections, and the stripped-off reinforcement cover is folded back; as well as the cable carrier, to which the cable is fastened with the fold-back section of the reinforcement cover, and a strengthening member, around which the fold-back section of the reinforcement cover is looped, wherein the stripped-off reinforcement cover is formed as at least one fixation tab.

20. Cable fixture assembly according to claim 19, wherein the fixation tab is shaped as a thread having a defined thread size (W6a).

* * * * *